United States Patent
Christoph et al.

(10) Patent No.: US 9,599,456 B2
(45) Date of Patent: Mar. 21, 2017

(54) METHOD AND ARRANGEMENT FOR TACTILE-OPTICAL DETERMINATION OF THE GEOMETRY OF A MEASUREMENT OBJECT

(75) Inventors: Ralf Christoph, Giessen (DE); Matthias Andräes, Florstadt (DE); Ingomar Schmidt, Buseck (DE); Markus Hechler, Wetzlar (DE); Benjamin Hopp, Giessen (DE)

(73) Assignee: WERTH MESSTECHNIK GMBH, Giessen (DE)

( * ) Notice: Subject to any disclaimer, the term of this patent is extended or adjusted under 35 U.S.C. 154(b) by 1096 days.

(21) Appl. No.: 13/512,351

(22) PCT Filed: Nov. 26, 2010

(86) PCT No.: PCT/EP2010/068327
§ 371 (c)(1),
(2), (4) Date: Aug. 13, 2012

(87) PCT Pub. No.: WO2011/064339
PCT Pub. Date: Jun. 3, 2011

(65) Prior Publication Data
US 2012/0327221 A1 Dec. 27, 2012

(30) Foreign Application Priority Data

Nov. 26, 2009 (DE) .......... 10 2009 044 673
Dec. 23, 2009 (DE) .......... 10 2009 059 298
Mar. 24, 2010 (DE) .......... 10 2010 016 127

(51) Int. Cl.
*G01B 11/00* (2006.01)
*G01B 5/016* (2006.01)

(52) U.S. Cl.
CPC ............ *G01B 11/007* (2013.01); *G01B 5/016* (2013.01)

(58) Field of Classification Search
CPC .. H04N 7/18; A61B 5/06; A61B 5/227; A61B 5/4337; A61B 5/6847; A61B 5/7264
See application file for complete search history.

(56) References Cited

U.S. PATENT DOCUMENTS 5,825,666 A 10/1998 Freifeld
2004/0118000 A1 6/2004 Roth et al.
(Continued)

FOREIGN PATENT DOCUMENTS

CN 101553707 10/2009
DE 10108774 A1 9/2002
(Continued)

OTHER PUBLICATIONS

Chinese Search Report dated Dec. 2, 2014, corresponding to Chinese Appln. 201080062452.2.
(Continued)

*Primary Examiner* — Dave Czekaj
*Assistant Examiner* — Kehinde O Abimbola
(74) *Attorney, Agent, or Firm* — Ladas & Parry LLP

(57) ABSTRACT

The invention relates to a method and arrangement for determining structures and/or geometry of a workpiece in a coordinate measuring machine by means of a tactile-optical measuring method, wherein the position of a shaped probe element is determined in at least one direction by means of a first sensor using an optically lateral measuring method, and the position of the shaped probe element is determined in at least one second direction using at least one distance sensor. In order to allow the error-free detection of the shaped probe element using the sensors, the invention proposes that at least one flexible connector element is used in a mounting for fastening the shaped probe element, permeated by the beam path of the first sensor in the beam direction, wherein the connecting element is transparent (Continued)

Figure 1:
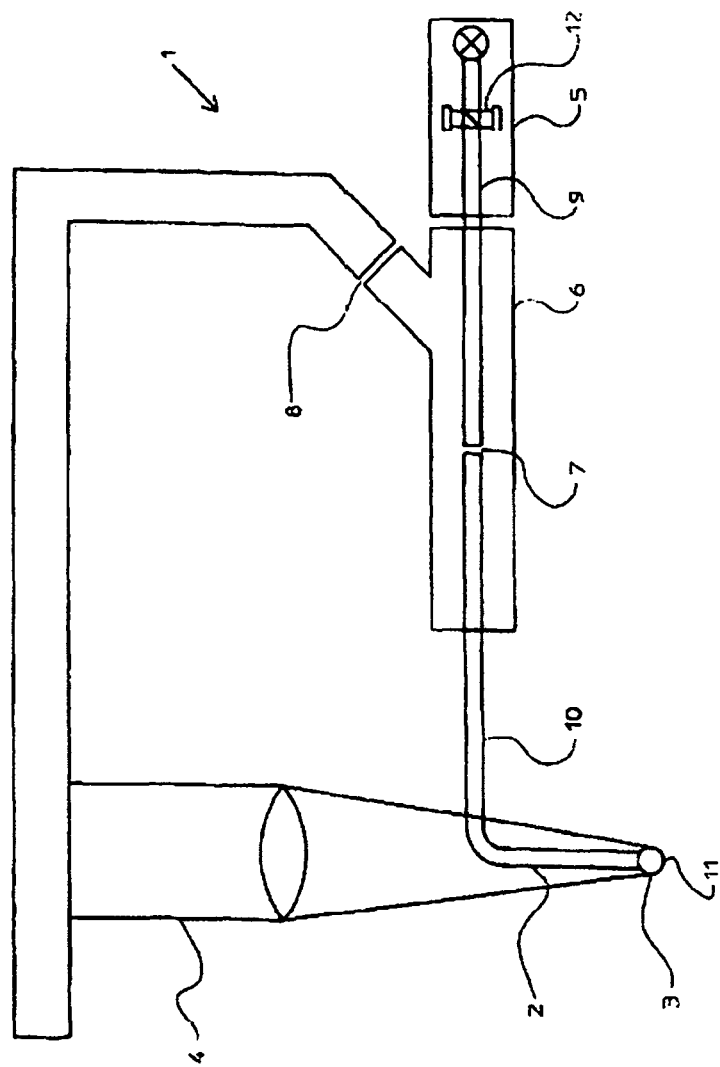

and/or is disposed severely out of focus with respect to the first sensor.

33 Claims, 13 Drawing Sheets

(56) References Cited

U.S. PATENT DOCUMENTS

| | | |
|---|---|---|
| 2005/0000102 A1* | 1/2005 | Christoph et al. ............... 33/503 |
| 2005/0259271 A1* | 11/2005 | Christoph ..................... 356/601 |
| 2006/0007449 A1* | 1/2006 | Christoph et al. ............ 356/601 |
| 2006/0209379 A1* | 9/2006 | Guscho ......................... 359/245 |
| 2007/0040107 A1* | 2/2007 | Mizota et al. ................ 250/221 |
| 2007/0043508 A1* | 2/2007 | Mizota et al. .................. 702/19 |
| 2008/0075227 A1* | 3/2008 | Christoph et al. .............. 378/23 |
| 2010/0014099 A1* | 1/2010 | Christoph et al. ............ 356/602 |
| 2010/0145653 A1* | 6/2010 | Christoph et al. ............ 702/152 |
| 2010/0253931 A1 | 10/2010 | Meier et al. |

FOREIGN PATENT DOCUMENTS

| | | |
|---|---|---|
| DE | 10 2005 037 160 | 2/2007 |
| JP | H10054833 A | 2/1998 |
| JP | 2004-521339 | 7/2004 |
| JP | 2002-503339 | 12/2005 |
| WO | 0225206 A1 | 3/2002 |

OTHER PUBLICATIONS

Japanese Office Action dated Apr. 4, 2014, corresponding to Japanese Appln. 2012-540443.
Chinese Office Action dated Jan. 26, 2016, corresponding to Chinese Application. 201080062452.2.

* cited by examiner

METHOD AND ARRANGEMENT FOR TACTILE-OPTICAL DETERMINATION OF THE GEOMETRY OF A MEASUREMENT OBJECT

The invention relates to a method for the determining of the geometry of an object of measurement by a tactile, optical measuring method. The invention also relates to an arrangement for the determining of structures and/or geometry of an object such as a workpiece with a tactile, optical measuring method.

In particular, the invention relates to a method for the determining of structures and/or geometry of an object such as a workpiece in a coordinate measuring device by a tactile, optical measuring method, whereby the position of a touching form element or at least of a mark associated with the latter is determined in at least one direction such as the X and/or Y direction of the coordinate measuring device by a first sensor with an optically laterally measuring method and the position of the touching form element or at least of the mark associated with the latter is determined in at least one second direction such as the Z direction of the coordinate measuring device with at least one distance sensor, and relates to an arrangement for the determining of structures and/or geometry of an object such as a workpiece in a coordinate measuring device with a tactile, optical measuring method, whereby an optically laterally measuring method that detects the position of a touching form element or at least of a mark associated with the latter in at least one direction such as the X and/or the Y direction of the coordinate measuring device by a first sensor and at least one distance sensor that detects the position of a touching form element or at least of the mark associated with the latter in at least one second direction such as the Z direction of the coordinate measuring device are coupled.

According to EP-B-1 082 581 a structure of an object is measured by a touching form element associated with a coordinate measuring device, the position of which touching form element is determined by an optical sensor. It consequently concerns a tactile, optical measuring method. In it, the sensor and the feeler are constructed as a unit that can be adjusted in common. This can be carried out according to WO-A-02/025206 by a rotary pivotable articulation. Reference is expressly made to the disclosures in these documents. The spatial position of a feeler is determined by two optical sensors in DE-U-298 08 683 of which the one measures the Z coordinate and the other one the X, Y coordinates. The same results from the DE. J.: tm-Technisches Messen 66 (1999) 12, pp. 1-5, Schwenke et al.: "Opto-Tactile Sensor for the 2-D and 3-D Measuring of Small Structures with Coordinate Measuring Devices".

In the previously known optical, tactile measuring systems known in the prior art as fiber feelers, the 3-dimensional detection of a touching form element or of a mark associated with the latter takes place by one or several one-dimensional or two-dimensional optical measuring systems arranged almost vertically relative to each other such as CCD- or CMOS image detection devices or from the combination of a two-dimensional image detection device and of a one-dimensional, relatively measuring distance sensor such as a homodyne interferometer (WO-A-2007/033811) or on the basis of a speckle image evaluation (DE-A-10 2005 021 645).

A 3-D feeler developed at the "National Physical Laboratory" (NPL) shows an almost isotropic behavior of the touching force but only for a stiff touching pin and while using piezoelectric evaluation systems for the determination of the tipping and deflection of the touching pin. The deflection is calculated in the three spatial directions from 6 measured bends or expansions of thin, rectangular sensor elements and the tipping around the latter calculated (Prof. Richard Leech, NPL, United Kingdom—"Development of a 3D vibrating micro-CMM probe using an active triskelion flexure" on "Microparts" Interest Group Workshop, Oct. 28-29, 2009, National Physical Laboratory, Teddington, UK).

A 3-D microfeeler marketed by the company "XPRESS Precision Engineering" has a similar function. The stiff feeler pin is fastened in it on a silicon chip and the deflection determined with the aid of piezoresistive elements that are integrated in the silicon chip (Ernst Treffers, Director Business Development, Xpress Precision Engineering, The Netherlands—"Gannen series: 3D tactile probes for microparts" on "Microparts" Interest Group Workshop, Oct. 28-29, 2009, National Physical Laboratory, Teddington, UK and internet site www.x-presspe.com and www.xpresspe.com/probe2.html on Dec. 16, 2009). An areally light-permeable holder for a tactile touching head is known from DE-A-101 08 774. The holder makes it possible with an observation camera arranged above the touching head to observe the tip of the touching pin through the carrier component necessary for the fastening and evaluation of the deflection of a touching pin in order to follow the tactile measuring, in particular the approach to the workpiece surface, which is otherwise difficult to observe. The observation camera cannot be used to measure the position of the touching tip and thus contains no means for image processing.

The known methods have the disadvantage that the relative or absolute position of the element to be detected such as a touching form element or a mark associated with the latter cannot be optically detected or only detected in an insufficiently precise or rapid manner.

In particular, the problem is not solved here that a rapid evaluation of the relative or absolute position of the element to be detected takes place in the imaging direction of the optical image detection system used for the determining of the lateral deflection of the element to be detected or that the movements around the rotary degrees of freedom are detected.

Moreover, there are no solutions for producing the reflection of the measuring beam of an interferometer or is distance sensor or sensor in accordance with a focusing method such as autofocusing, or of an image processing sensor on the surface of the element to be detected such as a touching form element or of the mark associated with the latter.

A coordinate measuring device with a rigid feeler is known from U.S. Pat. No. 5,825,666 that has two target marks in order to be able to make conclusions with them about the spatial position of the touching form element.

WO-A-021106765 relates to a method for measuring objects in which the Z position of the touching form element of a tactile, optical feeler is measured with a laser distance sensor. Furthermore, an image processing sensor can be provided.

An arrangement and a method for the optical, tactile measuring the structures of an object with a coordinate measuring device can be gathered from WO-A-02/25206. A first optical sensor and a mechanical feeler with a touching form element are integrated to a unit. In order to measure the touching form element three-dimensionally a second optical sensor with the same type of construction is used whose optical axis runs vertically to that of the first optical sensor.

A generic device is known from WO-A-03/008905. The position of a touching form element or the surface properties of an object are selectively measured with the distance sensor. Alternatively, the position of the touching form element can be measured with an image processing sensor, whereby the distance sensor then serves to illuminate the touching form element.

According to U.S. Pat. No. 6,441,910 a coordinate measuring device comprises a mechanical feeler and an optical sensor in order to be able to measure an object optotactically. The mechanical feeler and the optical sensor can be adjusted as a unit.

In order to measure an object by a coordinate measuring device the position of a feeler can be adjusted according to DE-A-198 05 892 by an optical detection device that can be adjusted independently of the feeler.

According to EP-A-0 965 816 geometric structures of an object are measured with an optical detection device and a feeler that can move independently of one another.

Consequently, previously known methods and coordinate measuring devices basically relate only to a partial solution of the entire problem in order to ensure an exact spatial determination of the position of the touching form element.

According to WO-A-98/57121 a photogrammetric based on triangulation is used for a 3-dimensional determination of the position of the touching element.

A coordinate measuring device with mechanically feeling sensors can be gathered from DE-A-43 27 250. Here, a visual check of the mechanical touching process can take place with the aid of a monitor in order to avoid destroying the feeler.

U.S. Pat. No. 4,972,597 describes a coordinate measuring device with a feeler whose feeler extension is prestressed by a spring in its position.

According to WO-A-99/63301 a structure of an object is measured with a touching form element associated with a coordinate measuring device, the position of which element is detected by an optical sensor. The sensor and the feeler are constructed as a unit that can be adjusted in common. This can take place according to WO-A-02/025206 from a rotary pivoting articulation.

According to DE-U-298 08 683 the spatial position of a feeler can be determined by two optical sensors, one of which measures the Z coordinate and the other the X, Y coordinates. The same results from the DE. J.: tm-Technisches Hessen 66 (1999) 12, pp. 1-5, Schwenke et al.: "Opto-Tactile Sensor for the 2-D and 3-D Measuring of Small Structures with Coordinate Measuring Devices".

A method and a device for measuring an object with a coordinate measuring device are known from EP-B-1 528 354. In order to make possible a three-dimensional determination of the position of a touching form element while minimizing measuring errors, an optical sensory mechanism is used that comprises a distance sensor and an image processing sensor with a common optical beam path. Both sensors always detect the same mark of the touching form element itself. In particular, it is not possible to detect a mark or the touching form element with the image processing sensor if the mark measured by the distance sensor is located above the mark that is to be detected in front of the image processing sensor since in order minimize measuring errors the fastening of the fiber used is arranged close to the mark of the distance sensor in order to minimize lateral shifts during the deflection of the touching form element, as a result of which the fastening covers the mark or the touching form element detected by the image processing sensor. In addition, the problem of bringing the mark or the touching form element detected by the image processing sensor to self-illuminate remains unsolved since the mark of the laser reflector does not allow an appropriately necessary coupling in of light into the fiber and the mark or the touching form element located under the laser reflector.

The present invention has the task of avoiding the disadvantages of the prior art and to basically make possible a rapid and precise detection of the relative or absolute position of the element to be detected, such as a touching form element or a mark associated with the latter.

The task is substantially solved by a method in which the position of an touching form element and/or at least one mark associated with the latter is determined in at least one direction with an optically laterally measuring method such as 2-D image processing, and the position of the touching form element and/or at least of one mark associated with the latter is determined in at least one second direction with at least one distance sensor such as an interferometer, preferably an absolutely measuring heterodyne interferometer, and/or by a laser distance sensor or sensor according to the focus principle such as an autofocus sensor and/or image processing sensor and/or by the evaluation of mechanical-electrical sensors in the holder of the touching form element, whereby the method is preferably used in a coordinate measuring device and preferably every sensor can be positioned in the X, Y and/or Z direction relative to an object of measuring.

The present invention solves the task by using an absolutely or relatively measuring distance sensor such as an interferometer, laser distance sensor or focus sensor such as an autofocus. The precision that can be obtained by the using of interferometers is advantageously in the range of a few nanometers or below it. Also, data rates of several thousand measured values per second can be achieved with interferometers. The distance sensor used determines the position of the touching form element or of the associated mark by reflection of the measuring beam on the touching form element or the associated mark by appropriate reflection layers.

According to the invention a method is particularly suggested for the determining of structures and/or the geometry of an object such as a workpiece in a coordinate measuring device by means of a tactile, optical measuring method, whereby the position of a touching form element or at least of a mark associated with the latter is determined in at least one direction such as the X and/or Y direction of the coordinate measuring device by a first sensor with an optically laterally measuring method and the position of the touching form element or at least of the mark associated with the latter is determined in at least one second direction such as the Z direction of the coordinate measuring device with at least one distance sensor, that is distinguished in that in order to fasten the touching form element and the optionally at least one mark associated with the latter in a holder at least one flexible connecting element is used that is passed through by the beam path of the first sensor in the direction of the beam and that the at least one flexible connecting element is transparent and/or is arranged in a strongly defocused manner relative to the first sensor.

In addition, a distance sensor or interferometer or focus sensor is preferably used, especially a heterodyne interferometer that operates with several wavelengths and as a result measures in an absolute manner, as can be gathered from the prior art.

The supplying of the measuring radiation of the interferometer preferably takes place by the feeler extension, known from the prior art of the fiber feeler, in the form of an optical fiber such as, for example, an optical waveguide, whereby the optically active connection preferably takes place on a fiber end or by Y-couplers or via an optical, preferably neutral divider layer or deflection layer of a prism or thin layer arranged above the upper fiber end. The reflection takes place on or close to the element to be detected, for example, on a reflection layer, introduced on the upper fiber end, below the deflection prism or on the metal-coated bottom of the touching form element. Subsequently, the measuring radiation again passes the supply in the opposite direction in order to interfere with the reference beam path of the interferometer.

The determination of the absolute position of the element to be detected with the aid of the measuring data of the distance sensor takes place vertically parallel to the evaluation of the lateral deflection of the element to be detected, which evaluation is described in the prior art. In addition, this distance sensor is operated in accordance with the invention almost simultaneously or synchronously with the measuring system for determining the lateral deflection and preferably forwards the measured data or measured signals to a higher-order evaluation system.

The higher-order evaluation system calculates the three-dimensional position of the element to be detected from the measured data or measured signals of the distance sensor and from the measured data of the measuring system for determining the lateral deflection of the element to be detected.

The touching form element can be manually or automatically removed from the beam path of the other optical sensors by the arrangement of the feeler extension and optionally of the interferometric measuring system at a change interface. This makes it possible to also use the image processing sensor and the other optical sensors for the direct measuring of the structures and/or the geometry of an object such as a workpiece.

In addition, a corresponding arrangement for the implementation of the method in accordance with the invention contains at least one touching form element and preferably a mark associated with the latter, a detection means detecting the touching form element and/or the mark in an optically 2-dimensional manner and contains a distance sensor detecting the position in the third dimension.

The measuring radiation of the interferometric distance sensor is supplied to the element to be measured such as a touching form element or a mark associated with the latter preferably by the feeler shaft, such as an optical waveguide, connecting the element to be measured to the detection means that optically detects in a 2-dimensional manner.

The initially explained prior art, in particular the two-dimensional optical evaluation of the deflection of a touching form element or of a mark associated with the latter, the fastening of a touching form element on a flexible feeler extension and the arrangement on a rotary-/pivoting articulation as well as the separable fastening on a change interface also constitute, in conjunction with the method in accordance with the invention or with the arrangement in accordance with the invention, a component of the present invention.

The invention provides an isotropic fastening of an optically detectable touching form element. This type of fastening makes possible a directionally independent touching force during a deflection of the touching form element by almost the same stiffness in all directions.

Furthermore, in addition to the deflection even the rotation of the touching form element can be determined about each of the three spatial directions. This makes the use of arm configurations or star feeler configurations possible.

According to the invention there is the possibility that the illumination of the touching form element or of a mark associated with the latter takes place by an epi-illumination such as a dark-field- or bright-field top illumination so that the using of transillumination or the coupling of light into the fiber could be avoided.

Consequently, the invention is distinguished among other things by a method for the determining of structures and/or of the geometry of an object such as a workpiece by a tactile, optical measuring method, whereby the position of a touching form element or at least of a mark associated with the latter is determined in at least one direction by an optically laterally measuring method such as 2-D image processing, and the position of the touching form element and/or of at least one mark associated with the latter is determined in at least one second direction with at least one distance sensor such as interferometers, preferably absolutely measuring heterodyne interferometers, and/or by a laser distance sensor or a sensor in accordance with the focus principle such as an autofocus sensor and/or image processing sensor, in particular laterally measuring image processing sensors in the holder of the touching form element.

In an independent embodiment different marks, preferably at different vertical distances, are used for the lateral determination of the position of the touching form element and for the vertical determination of the position of the touching form element with the distance sensor. In particular, it is provided that different marks, preferably at different vertical distances are used for the lateral determination of the position of the touching form element or at least of the mark associated with the latter with the optically laterally measuring method and for the determination of the position of the touching form element or at least of the mark associated with the latter in the second, such as the vertical direction with the distance sensor.

It is provided in accordance with this invention that the one connecting element, preferably several flexible connecting elements, are appropriately dimensioned and arranged for generating forces that are independent in at least two directions and/or for generating almost the same mechanical stiffness upon deflection, whereby the flexible connecting elements preferably emanate from an annular holder structure and the beam paths of the optical sensors for measuring the touching form element and/or the associated mark penetrate the arrangement of the flexible connecting elements in the direction of radiation.

Furthermore, the invention is distinguished in that the arrangement of optical sensors and flexible connecting elements takes place in such a manner that the connecting elements are strongly defocused or transparent and as a result are practically ineffective for the function of the optical measuring.

The flexible connecting elements can preferably be connected to an annular holder structure.

In particular, it is provided that each sensory mechanism can be positioned in the X, Y and/or Z direction relative to the object of measurement.

The method should also be used in a coordinate measuring device.

It is provided in accordance with this invention that the position of a touching form element or at least of the mark associated with the latter is determined in two directions with an optically laterally measuring method, preferably in image processing sensor with a matrix camera such as a CCD camera or CMOS camera, and in the third direction with a distance sensor such as an absolutely or relatively measuring interferometric sensor, and/or laser distance sensor and/or focus sensor such as an autofocus sensor and/or image processing sensor, preferably laterally measuring by beam deflection.

A concept enjoying independent protection is characterized in that the position of the touching form element or at least of the mark associated with the latter is determined in at least one direction by detecting the side, facing the sensory mechanism, of the touching form element or of the associated mark or touching form element and preferably associated shaft carrying at least one mark.

It is preferably provided that a layer such as a reflection layer is fastened on the side facing the sensory mechanism, which later preferably has color-selective properties that are designed in such a manner that the wavelength of the measuring radiation of the sensor used for determining the at least one direction is reflected and in addition the radiation of a light source with deviating wavelength is preferably transmitted.

It should be especially emphasized that the illumination of the touching form element and/or of the at least one associated mark and/or of the reflection layer facing the sensory mechanism takes place by:

a transillumination of the touching form element or of the mark from the direction opposite the sensor, whereby the reflection layer not covering the edges of the touching form element or of the mark throws a shadow into the image processing sensor that is used to evaluate the two-dimensional lateral position, and/or self-illumination of the touching form element or of the mark by coupling light into the touching form element or into the mark and/or the shaft, preferably laterally with the aid of a spliced light fiber attached underneath the reflection layer, whereby the reflection layer not covering the edges of the touching form element or of the mark throws a shadow into the image processing sensor that is used for evaluating the two-dimensional lateral position, and/or self-illumination of the touching form element or of the mark by coupling light into the touching form element or into the mark and/or the shaft, preferably laterally with the aid of a spliced light fiber attached underneath the reflection layer, whereby the distance between the luminous touching form element or first mark is great enough that the reflection layer of the second mark, which reflection layer is located above, does not cover at least the edge of the touching form element or of the first mark, and/or self-illumination of the touching form element or of the mark by coupling light into the touching form element or into the mark and/or the shaft, whereby the side of the coupling in, which side faces the sensory mechanism, is preferably coated with a color-selective layer and preferably with the aid of an optical, preferably neutral divider layer or deflection layer arranged above the upper shaft end, and/or by bright field illumination and/or dark field illumination associated with the image processing sensor, and/or by the measuring beam of the distance sensor or interferometer.

The invention preferably provides that a separate illumination takes place for the optically laterally measuring method and the measuring in the second direction or in the third direction in that different wavelengths are used and/or that the illumination is modulated and/or that the illumination takes place alternating in time, whereby a separation of the wavelengths takes place in the evaluation beam paths by mechanical filters such as color-selective layers and/or interference filters.

The measuring in the third direction expresses the fact that two directions lying in one plane are measured with the optically laterally measuring method. The second and the third direction are in so far the same from the measuring direction.

A concept of the invention to be emphasized is the fact that the measuring radiation of the interferometric measuring system is coupled into the optical fiber or optical waveguide, is subsequently reflected on or near the touching form element or a mark associated with the latter and subsequently runs at least partially through the optical fiber or optical waveguide in the opposite direction and subsequently interferes with the reference beam path of the interferometric measuring system.

The invention is distinguished in particular in that the measured values of the optically laterally measuring method such as an image processing system and of the at least one distance sensor are taken up almost simultaneously or synchronously and preferably the measured data and/or measured signals are forwarded to a higher-order evaluation system that calculates the three-dimensional position of the touching form element or of a mark associated with the latter from the measured data and/or measured signals.

The invention also provides that the rotation and/or tilting of the touching form element about one, two or three spatial directions is determined by measuring the positions of several associated marks, whereby the marks are detected by the optically laterally measuring method and/or by the at least one distance sensor.

In particular, the invention is also distinguished in that the rotation of the touching form element about the axis of the shaft is determined by measuring by at least one optically laterally measuring method in that the position of a directed structure applied on at least one mark is determined or the positions of at least two laterally offset marks associated with the touching form element are determined.

It should be emphasized that the bending and/or tilting of the shaft is detected by measuring at least two marks arranged on the shaft preferably in superposition with the aid of the optically laterally measuring method in two different working intervals and/or magnification stages of an associated zoom lens or by two cameras with different working intervals that selectively use a common imaging objective, whereby the lower or first mark or the touching form element is preferably illuminated by self-illumination. The upper or second mark is preferably formed by the upper shaft end or the reflection layer applied on the latter and illuminated by bright field illumination and/or dark field illumination.

This invention provides that the optically laterally measuring method and the distance sensor at least partially use the same beam path, whereby the separation of the measuring radiation associated with the two sensors takes place in that the two measuring radiations use different wavelengths and wavelength-selective dividers are used, or in that cyclically successive deflection elements such as deflection mirrors alternately couple in the measuring radiations of the two sensors or in that an optical element that cyclically changes the working distance such as a flexible lens, e.g., liquid lens, e.g., oscillating with 50 to 100 Hertz is used in order to align in a cyclically alternating manner and successively the measuring radiations of the two sensors onto the different working intervals.

The invention provides that the laterally measuring sensor and the distance sensor at least partially use a common beam path, whereby the separation of the beam courses of both sensors takes place by wavelength-selective elements or by cyclically introduced switching elements such as deflection mirrors or by flexible lenses such as liquid lenses, preferably oscillating with 50 to 100 Hertz, which lenses cyclically influence the working distance.

A separation of the beam courses is necessary since under certain instances different marks are detected by the two sensors (usually at a different working distance) and a separate evaluation of the returning radiation must take place. In order to make this possible in the at least partially same beam path (lens construction), the separation of the beam courses can be carried out by:
1. wavelength-selective elements (e.g., divider layers or divider cubes). Light is reflected or let through as a function of the wavelength; or
2. by deflection mirrors that can be alternately folded in and out and which switch in time between the two beam paths. The evaluation of the sensor must be appropriately synchronized with this; or
3. by cyclically switching the working distance with a flexible lens. Here too, the evaluation of the sensors must be appropriately synchronized.

It is preferably provided that the movement or deflection of the touching form element is determined in the given six degrees of freedom by linking the measured results from two different marks or a touching form element with two laterally measuring sensors such as image processing sensors and a distance sensor and/or neglecting the degree of rotational freedom about the shaft axis in five degrees of freedom.

The determination of the three degrees of rotational freedom can take place by:
1. Tilting about the horizontal; i.e., a lateral sensor with two working distances or two lateral sensors with a different working distance detect two superposed marks (FIG. 11c) or two distance sensors detect two adjacent marks (FIG. 11a),
2. by rotation around the shaft axis; i.e., a lateral sensor measures two marks attached next to one another (FIG. 11a) or a structural position on a mark is measured.

The determination of only two degrees or rotational freedom, i.e., limitation to a total of 5 degrees of freedom, takes place by measuring two superposed marks without a mark laterally attached next to them or a structure on the upper mark. These measures yield a simpler construction.

The invention provides in its design that the structures and/or geometry of an object such as a workpiece can be directly measured with optically laterally measuring methods and/or a distance sensor by manually or automatically removing the touching form element and the optionally associated mark and preferably the interferometric measuring system out of the beam path of the optically laterally measuring method.

The invention is also distinguished in that in addition to or alternatively to the detection with at least one of the sensors in the form of the optically laterally measuring sensor and of the distance sensor at least one direction of the position of the touching form element and/or of a mark associated with the latter takes place by means of at least one mechanical and electrical sensor integrated in the at least one connecting element of the holder of the touching form element, the electrical signals of which sensor are evaluated that change as a function of the deformation such as the bending and/or stretching and/or compression and/or torsion of the at least one flexible connecting element in a value such as amplitude, phase or frequency.

Mechanical electrical sensors are sufficiently known from the prior art such as wire strain gauges, whose resistance changes upon expansion. A signal evaluation usually takes place with the bridge circuit of two or four or more resistors. A bridge signal such as amplitude is measured. In other evaluation methods a deflection of the measuring signal is compensated and the compensation signal measured or a corresponding phase jump or frequency jump is detected.

It is preferably provided that the mechanical electrical sensor comprises at least two measuring elements such as wire strain gauges and/or piezoresistive sensors and/or inductive sensors and/or capacitive sensors, whereby several of their signals are preferably combined by computer.

The invention also provides that the optically laterally measuring sensor is used for the determining of the position of the touching form element and/or of a mark associated with the latter in two directions and that the mechanical electrical sensor is used for determining in the third direction and/or for determining the tilting of the touching form element and/or or of a mark associated with the latter about one, two or three directions.

The teaching is to be emphasized that the sensory mechanism comprising the sensors used is moved for determining the position of the touching form element and/or of the associated mark during the measuring relative to the object to be measured, whereby a synchronization takes place, preferably with the aid of a control unit that is connected via a trigger line to the sensory mechanism and to the traveling axes of the coordinate measuring device for moving the sensory mechanism relative to the object and at least relative to an illumination device or to a shutter associated with an image processing sensor as one of the sensors of the sensory mechanism, between:
  the measured value receiver of a first sensor of the sensory mechanism for the lateral measuring, preferably the image recording of the image processing sensor, and
  the measured value receiver of at least a second sensor of the sensory mechanism for the distance measuring, preferably the image recording of a second camera of the first or of a second image processing sensor or of the measured value receiver of the laser distance sensor or focus sensor or interferometric sensor, and
  the determination of the position of the traveling axes for the movement of the sensory mechanism relative to the object, and
  the release of a lightning like illumination by the illumination device or of the shutter associated with the image processing sensor.

In particular, the invention is distinguished in that the sensory mechanism used for the determining of the position of a touching form element and/or of a mark associated with the latter is moved during the measuring relative to the object to be measured and a measuring takes place, preferably with the image processing sensor, when the position to be measured has been roughly reached.

It is also provided that the sensory mechanism used for the determining of the position of a touching form element and/or of a mark associated with the latter is moved during the measuring relative to the object to be measured and that the object is measured in a scanning manner with the touching form element, that is, the workpiece is almost continuously touched.

It is preferable that at least the touching form element oscillates.

It is provided in particular that the initial measuring of the sensor and the measuring with the sensor for determining the three-dimensional position of the touching form element or of the associated mark takes place by extrapolation to a touching force=0 newtons in that the deflection determined by the sensor is preferably determined for at least one deflection direction of the touching form element for at least two deflection amounts that deviate from one another and a characteristic curve is determined from the above that describes the connection between the deflection and the touching force or between a magnitude proportional to the touching force.

It is provided in the design of the invention that the method in accordance with the invention for the determining of the roughness of the object is used, whereby the touching form element preferably has a shape like a needle, running out in a point, and the roughness determined with the distance sensor is corrected using the measured values of the laterally measuring method or associated in its lateral position. In contrast to the prior art this is detected directly or almost directly with the optically laterally measuring sensor by the fastening in accordance with the invention of the touching form element via optically non-operative fastening elements.

An arrangement for the determining of structures and/or geometry of an object such as a workpiece in a coordinate measuring device with a tactile, optical measuring method, whereby a distance sensor determining the position of a touching form element or at least of a mark associated with the latter in at least one direction such as the X direction and/or Y direction of the coordinate measuring device by a optically laterally measuring method detecting a first sensor, and at least one distance sensor detecting the position of a touching form element or at least of the mark associated with the latter in at least one second direction such as the Z direction of the coordinate measuring device are coupled, is distinguished in that the touching form element and the optionally at least one mark associated with the latter is fastened via at least one flexible connecting element, that the connecting element can be penetrated by the beam path of a first sensor used for carrying out the optically laterally measuring method in the direction of the beam, and that the at least one connecting element is transparent and/or is arranged in a strongly defocused manner relative to the first sensor, and is distinguished in that an optically laterally measuring method such as a 2-D image processing that detects the position of a touching form element and/or of at least one mark associated with the latter, and at least one distance sensor such as an interferometer, a preferably absolutely measuring heterodyne interferometer, and/or laser distance sensor and/or sensor in accordance with the focus principle such as an autofocus sensor and/or an image processing sensor, which distance sensor detects the position of the touching form element and/or of a mark associated with the latter in at least a second direction, are coupled to one another in particular by beam deflection of laterally measuring image processing sensors, and/or in the holder of the touching form element of integrated mechanical electrical sensors.

It is preferably provided that in order to produce independent forces in at least two directions and/or to produce almost the same mechanical stiffness during the deflection, at least two appropriately dimensioned, flexible connecting elements are arranged, whereby the flexible connecting elements preferably emanate from an annular holder structure and the beam paths of the optical sensors for measuring the touching form element and/or the associated market penetrate the arrangement of the flexible connecting elements is in the direction of radiation.

The optical sensors and the flexible connecting elements are arranged in such a manner here that the flexible connecting elements are strongly defocused or transparent and as a result are practically ineffective for the function of optical measuring.

In particular, it is provided that each sensory mechanism can be positioned in the X, Y and/or Z direction relative to an object of measurement.

Furthermore, the touching form element and/or at least one mark associated with the latter should emanate from a shaft that is preferably formed by a feeler extension such as an optical fiber or optical waveguide that is flexible in at least one degree of freedom.

It can also be provided that a mark for an optical 2-D sensor and a mark for the sensor for the third direction are different from or identical to one another. In particular, it is suggested that the same mark or different marks can be detected by the optical 2-D image processing sensor and by the sensor measuring the third direction in the form of the distance sensor or of a mechanical electrical sensor.

It is provided in the design that the shaft has an optically active connection, preferably on one end of the shaft and/or that can be preferably adjusted by a Y coupler or on one end of the shaft by arranging an optically, preferably neutral divider layer or deflection layer such as a prism above the shaft end for the interferometric measuring system or a light source.

Furthermore, there is the possibility that a reflection layer is provided on the touching form element or near the touching form element or near a mark associated with the latter or on the shaft end facing the sensory mechanism, preferably by coating with a reflecting layer and/or introducing a material limit by variation of the material of the feeler extension.

Independently of this, the touching form element or an associated mark of the shaft can carry a reflection layer that is preferably attached on the side facing the sensory mechanism and is preferably round and/or in the shape of an annular ring and preferably does not cover the edges of the touching form element and/or of the mark and preferably has color-selective properties.

Furthermore, there is the possibility that the touching form element or an associated mark is nearly spherical or tear-shaped and is preferably at least partially flattened on the side facing the sensory mechanism.

The invention also provides that the touching form element and an optionally associated mark and the shaft is fastened in such a manner that it can deflect in at least one direction on at least one connecting element that is flexible in at least one degree of freedom, preferably by adhesion and/or splicing, and that the connecting elements preferably contain integrated or attached mechanical electrical sensors.

Furthermore, it should be emphasized that flexible connecting elements have a rectangular, preferably narrow and flat or round cross-section, preferably with a small diameter and preferably do not completely cover at least the edges of the touching form element and/or of the at least one associated mark for the beam paths of the image processing sensor and/or of the distance sensor and/or of the focus sensor.

The invention is also distinguished in that flexible connecting elements for the production of forces that are independent in at least two directions and/or are dimensioned and arranged with almost the same mechanical stiffness upon deflection, whereby the flexible connecting elements preferably emanate from an annular holder structure.

It is also inventive that three or more flexible connecting elements are arranged circularly, preferably at the same angular steps about the shaft axis or at least one connecting element emanates laterally, preferably at an angle of 90° to 45° to the shaft axis facing in the direction of the sensory mechanism, from the shaft axis or from the touching form element or from an associated mark.

Another embodiment provides that flexible connecting elements are arranged in a plane above the touching form element or above a first mark and that at least one other mark is arranged above the flexible connecting elements that contains a reflection layer and/or that flexible connecting elements are arranged in a plane between a mark and the touching form element and that the mark contains a reflection layer.

It is preferably provided that several marks associated with the touching form element are arranged laterally adjacent to or in the direction of the shaft above the touching form element that can be detected successively or simultaneously by the image processing sensor and/or the distance sensor and/or the focus sensor and/or the interferometric sensor, whereby the image processing sensor is connected to a lens with changeable working distance and/or changeable magnification and/or with two cameras with different working distances that selectively use a common imaging lens.

The invention is also distinguished in that the touching form element and preferably a mark associated with the latter are preferably fastened together with the interferometric measuring system in a separable manner on a change interface and/or a rotary articulation or a rotary pivot articulation and can therefore be manually or automatically removed out of the beam path of the optically laterally measuring sensor.

This invention suggests that a touching form element connected to a shaft and preferably at least one mark associated with this touching form element and at least one connecting element that emanates from the shaft or from the touching form element or the mark and that is flexible in at least one degree of freedom is arranged in front of a sensory mechanism, which sensory mechanism consists of
- a preferably neutral divider layer, and
- a first branch connected to it and comprising or consisting of an illumination of the first wavelength and preferably of an imaging pattern, and
- a second branch connected to it and comprising or consisting of
  - an imaging beam path of a first wavelength such as an image processing beam path with a first working distance and a first camera, which imaging beam path is separated by a color-selective layer, and
  - an imaging beam path and/or illumination beam path of a second wavelength, which imaging beam path is separated by a color-selective layer and is preferably designed as a first or second image processing sensor with a second working distance and preferably a second camera or laser distance sensor or interferometric sensor or focus sensor.

Another aspect of the invention is the fact that the following components are connected to each other and can preferably be exchanged via a manual automatic change interface in front of the sensory mechanism used:
- a shaft-connected touching form element and preferably at least one mark associated with the latter,
- at least one connecting element emanating from the shaft or the touching form element or the mark and flexible in at least one degree of freedom, and preferably
- an optical, preferably neutral divider layer or deflection layer arranged above the touching form element or the associated mark or the shaft, and preferably
- a preferably color-selective layer arranged on the touching form element or on an associated mark or on the shaft end facing the sensory mechanism, and preferably
- at least one lens as a front lens attachment.

It is provided that the touching form element is connected directly or indirectly to a mechanical oscillating element such as a piezo-oscillator.

The sensory mechanism comprises the sensor for the optically laterally measuring method and comprises the distance sensor.

In particular, the arrangement is integrated in a coordinate measuring device.

Figure 2:
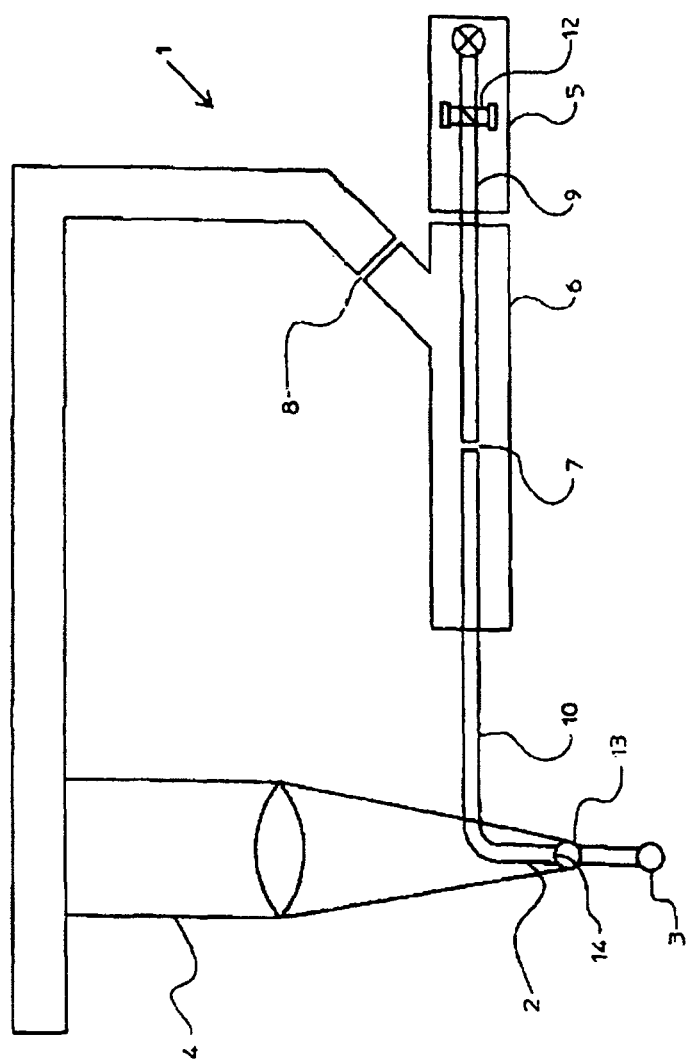
Figure 3:
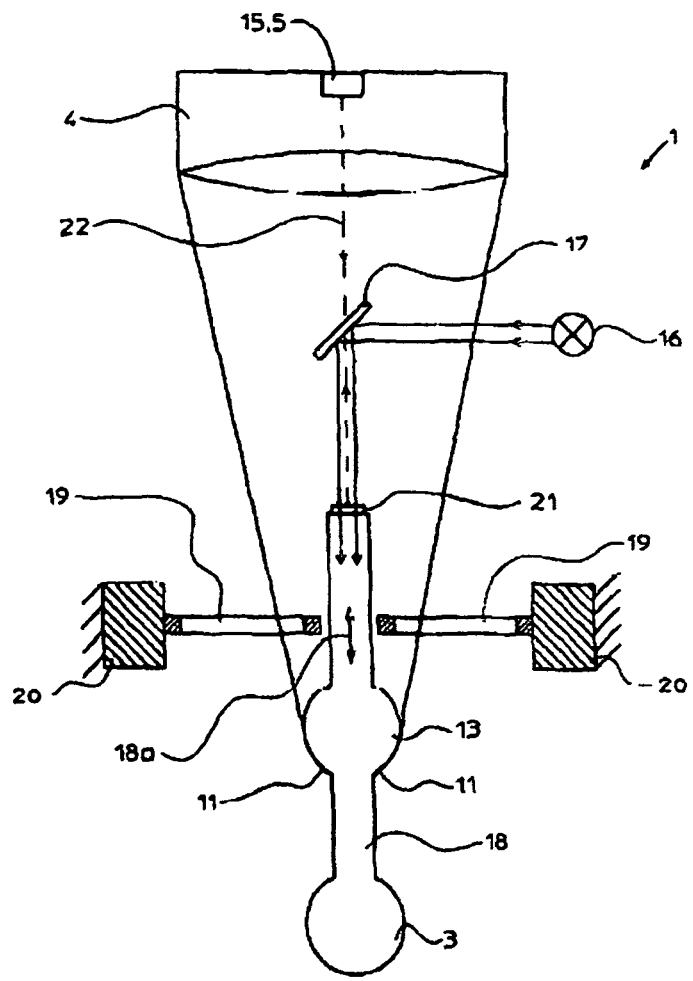
Figure 3A:
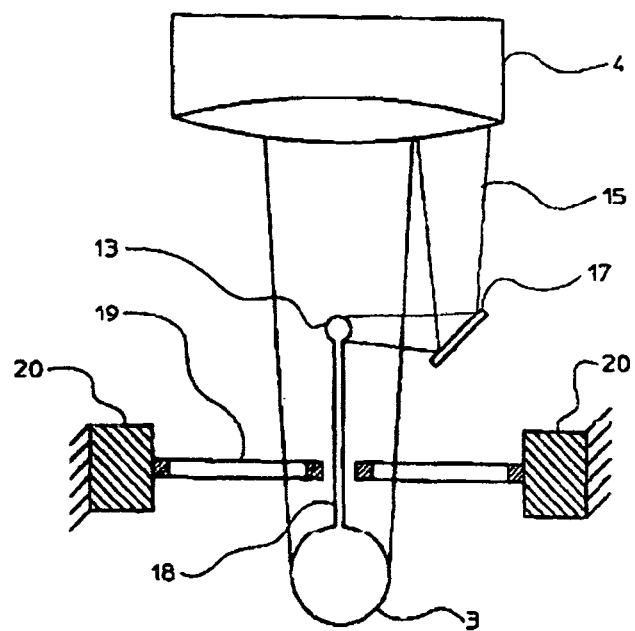
Figure 4:
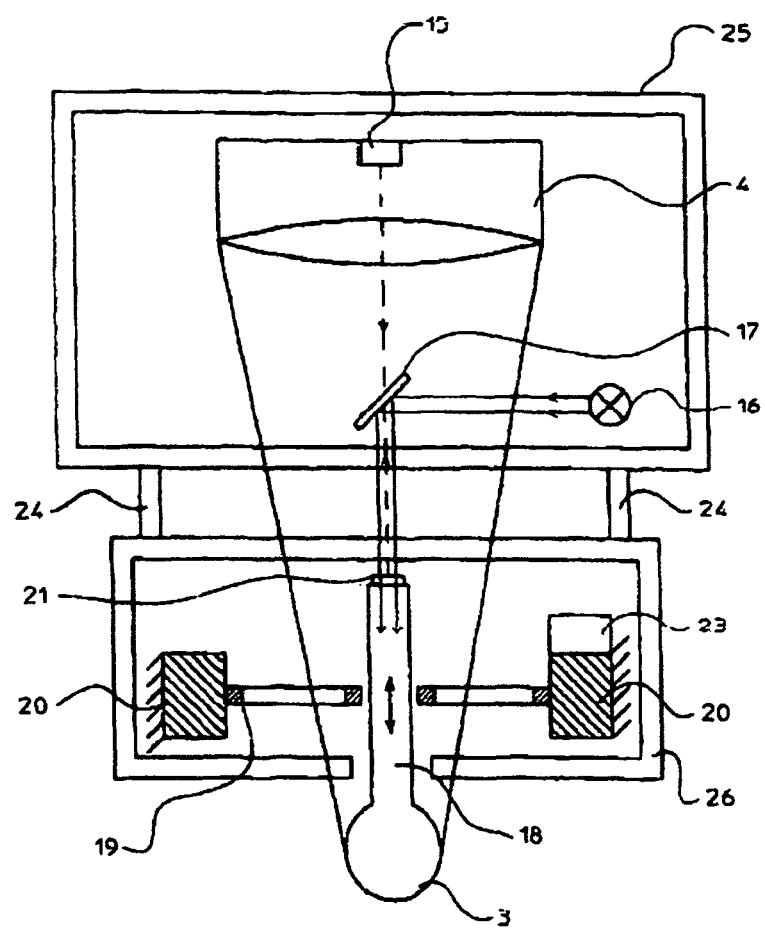
Figure 5:
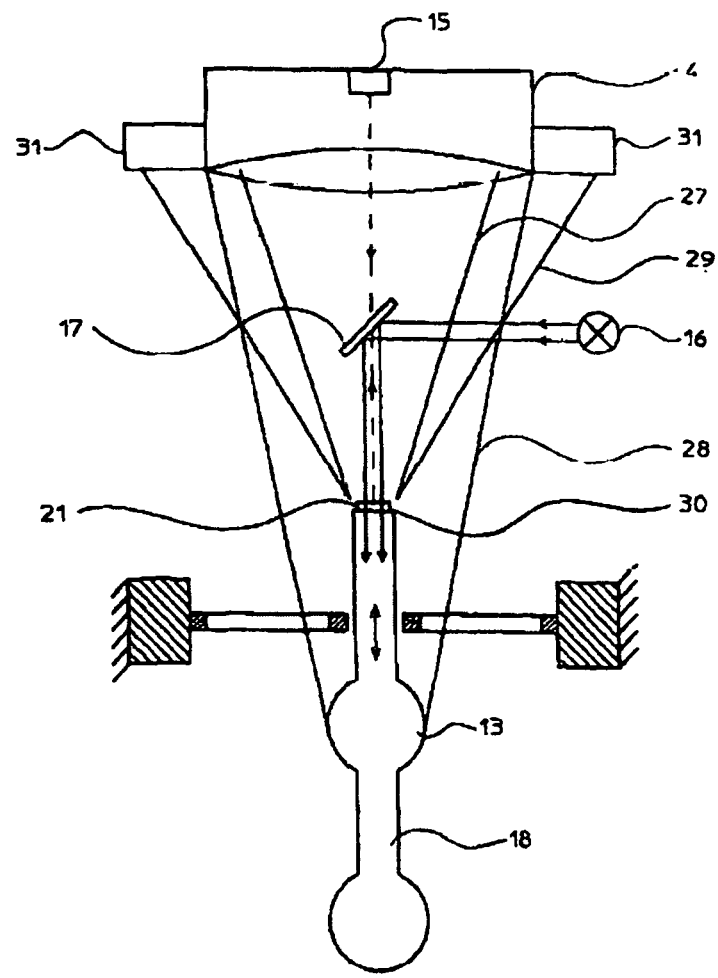
Figure 6:
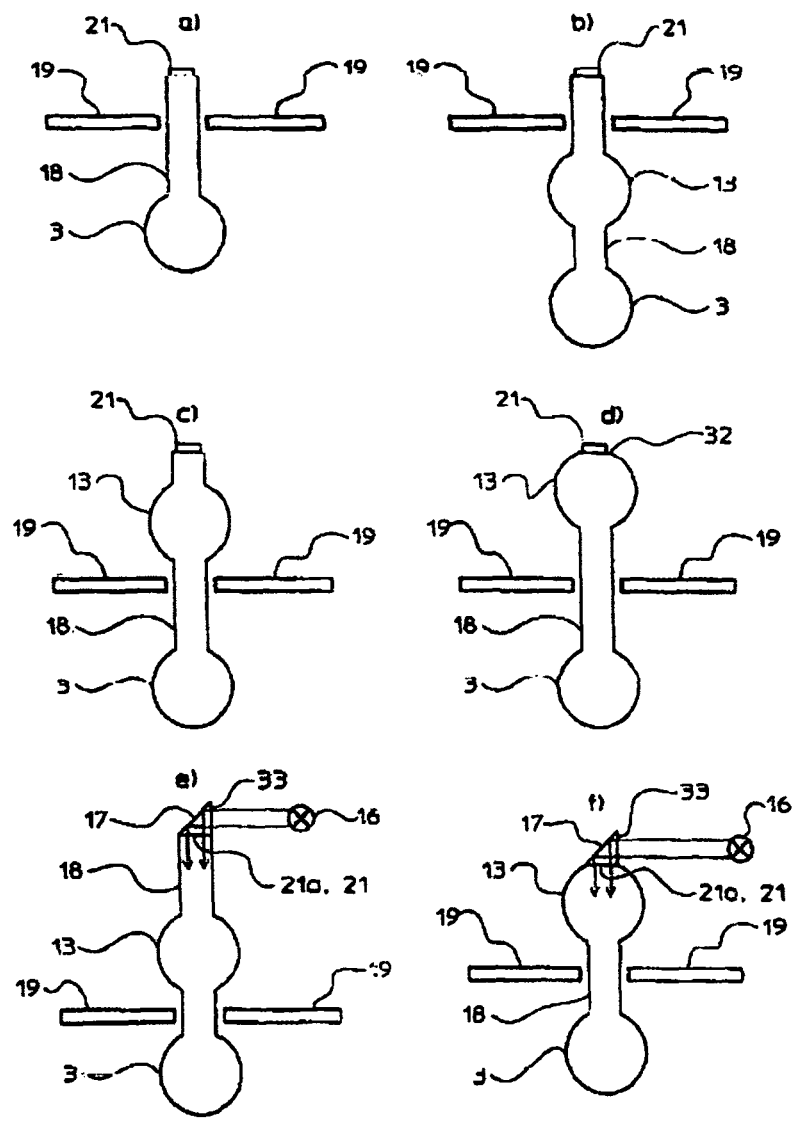
Figure 7:
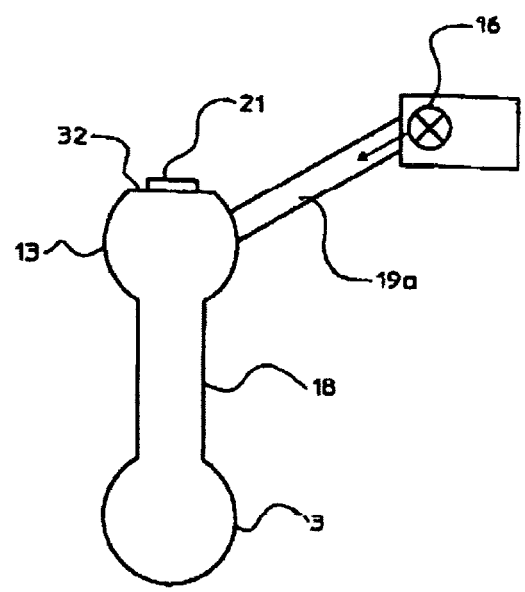
Figure 8:
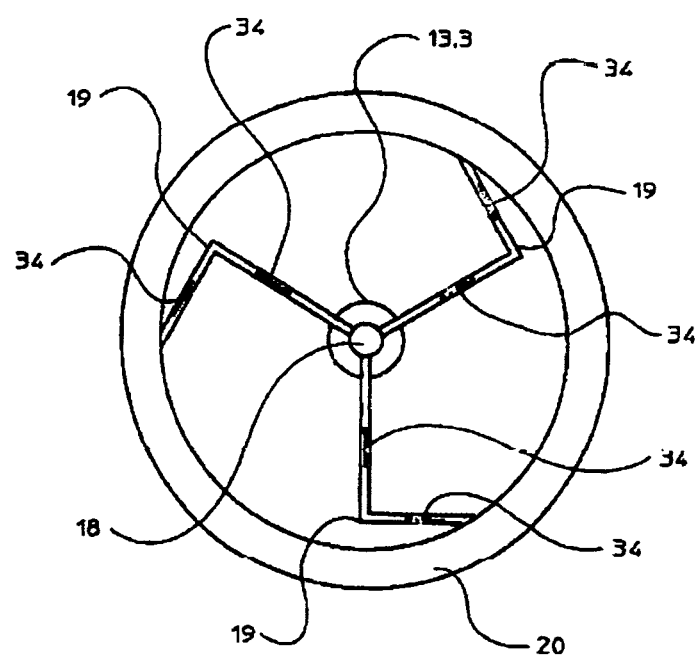
Figure 9:
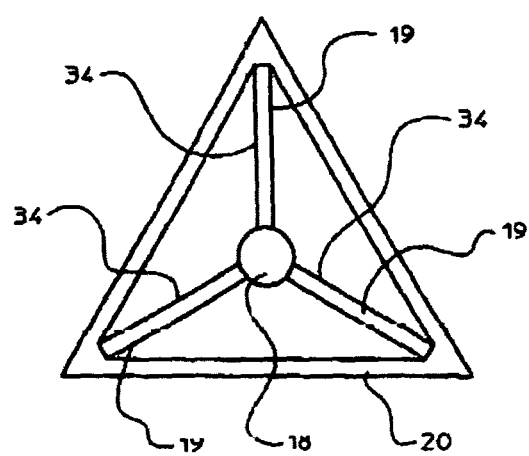
Figure 10:
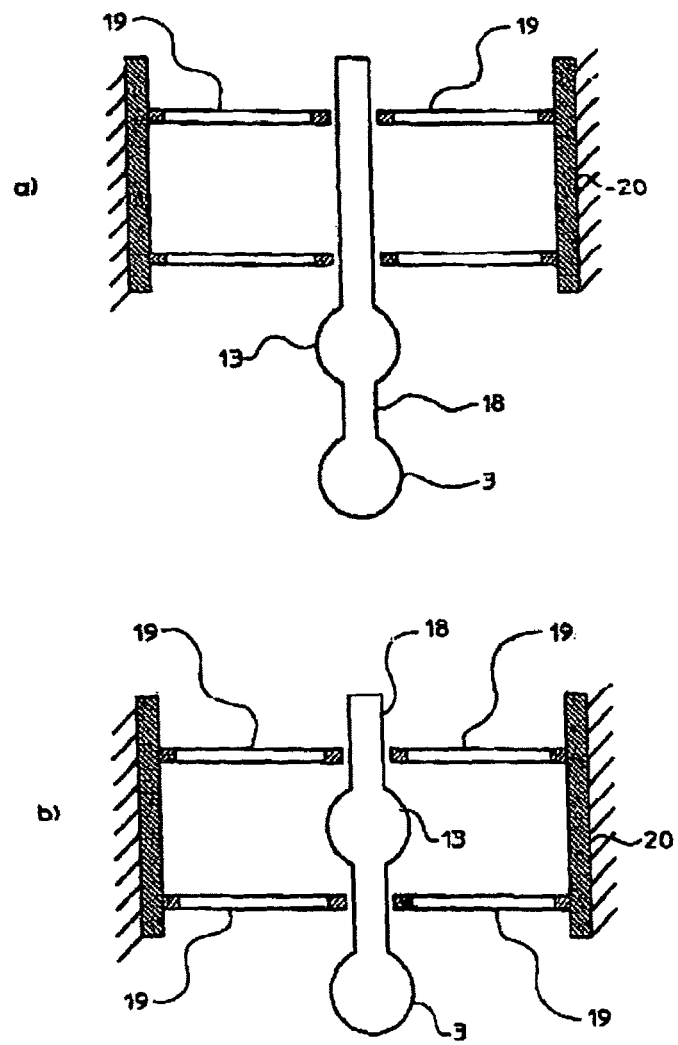
Figure 11:
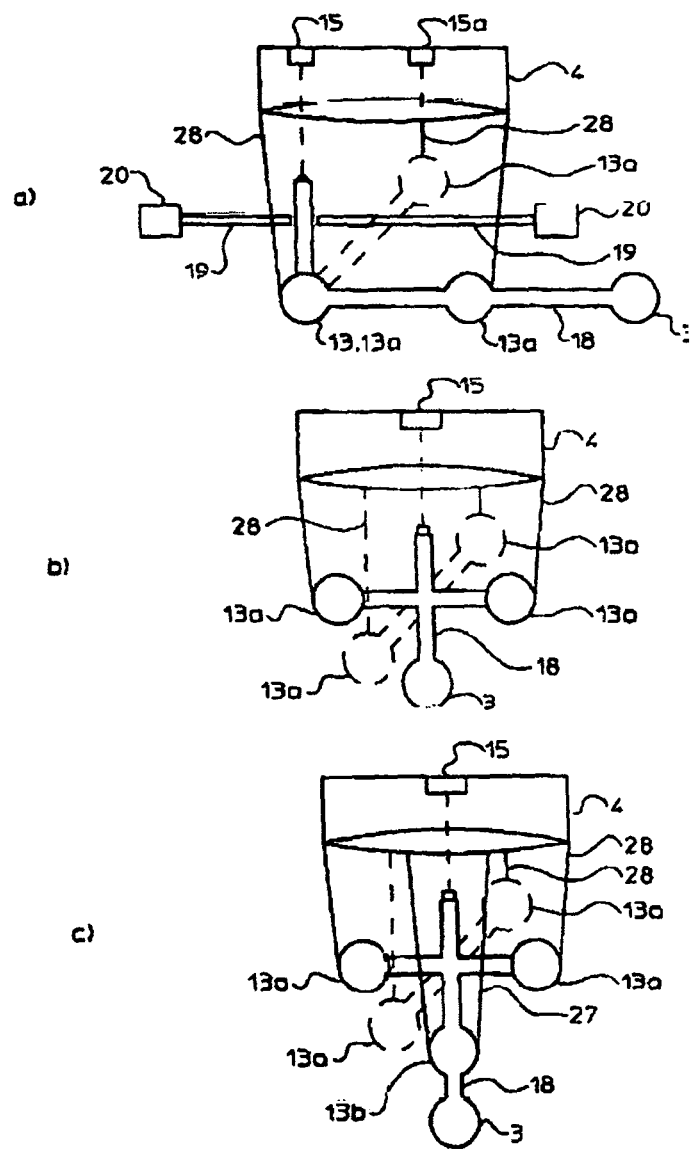
Figure 12:
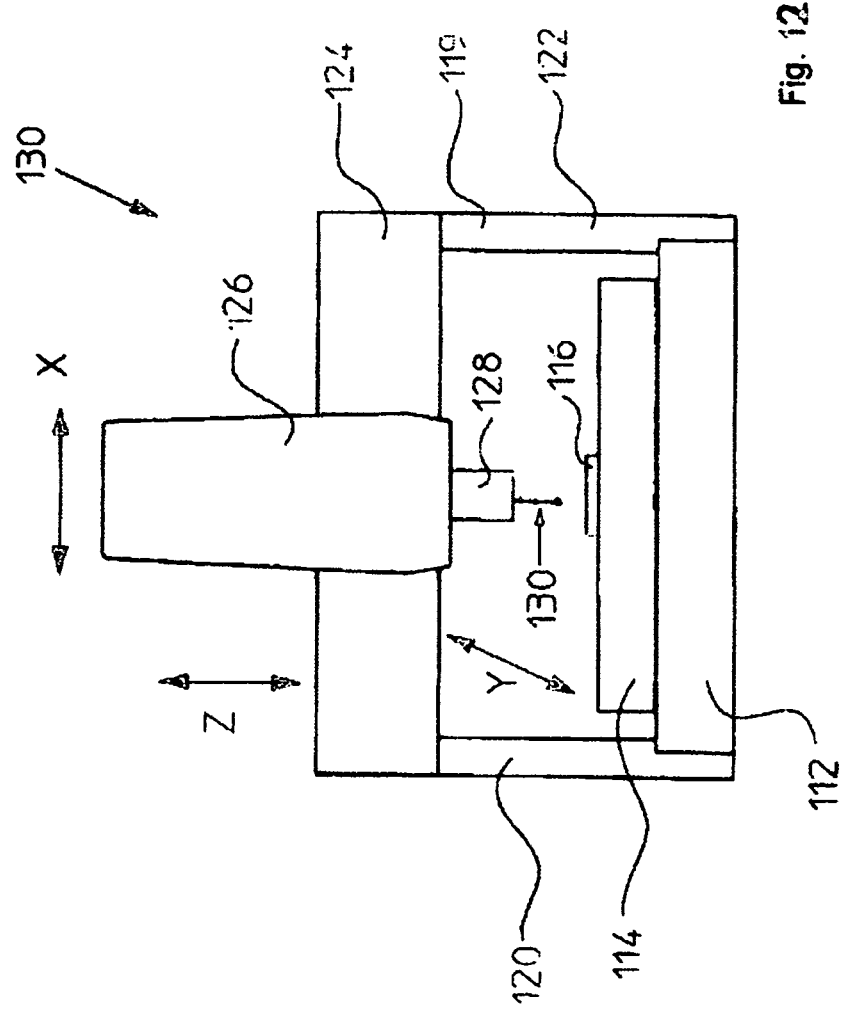
Figure 1:
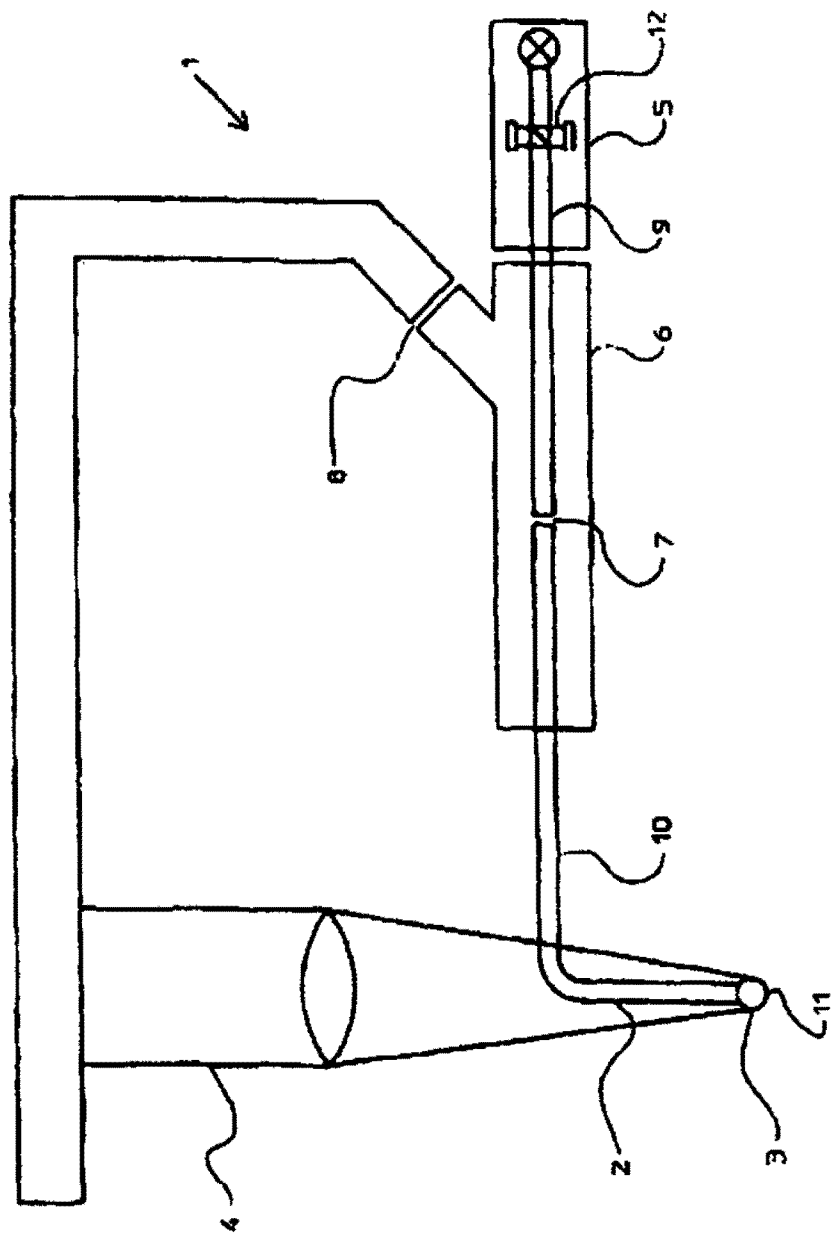
Figure 2:
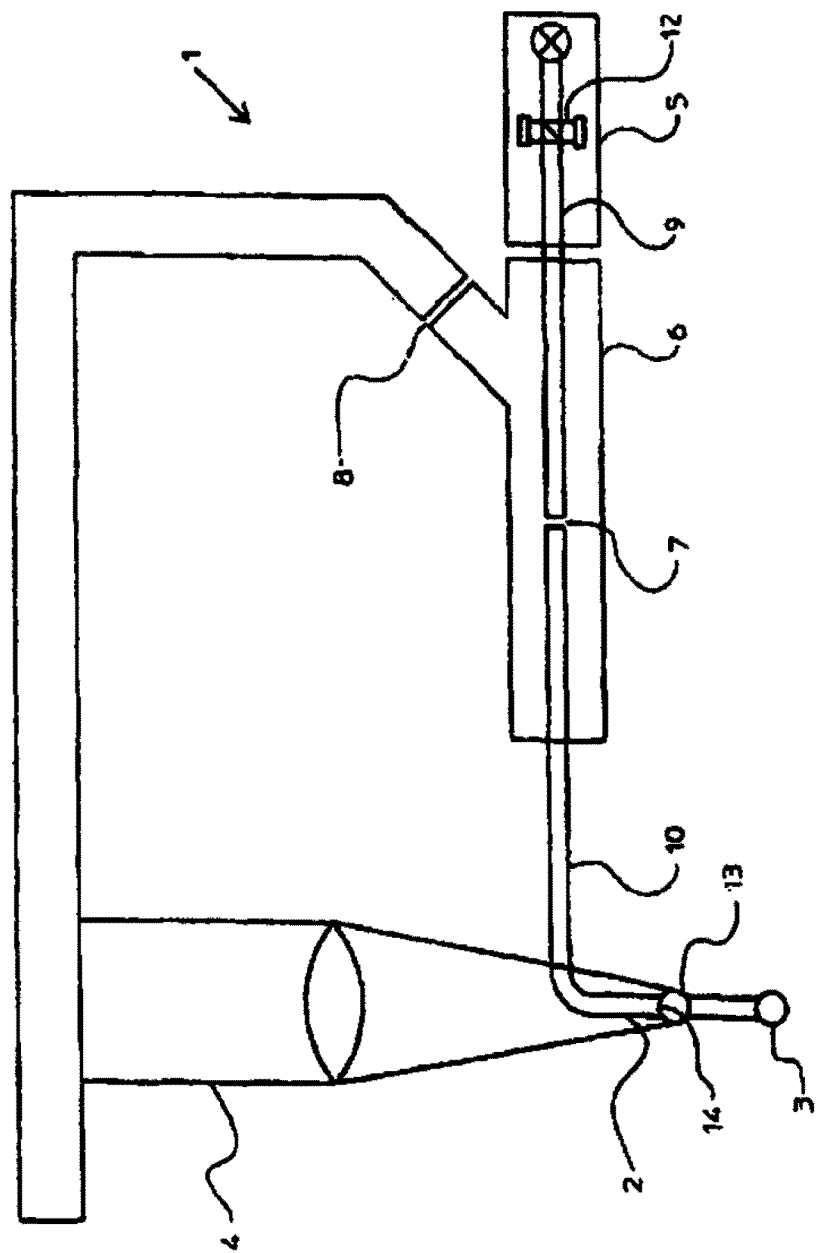
Figure 3:
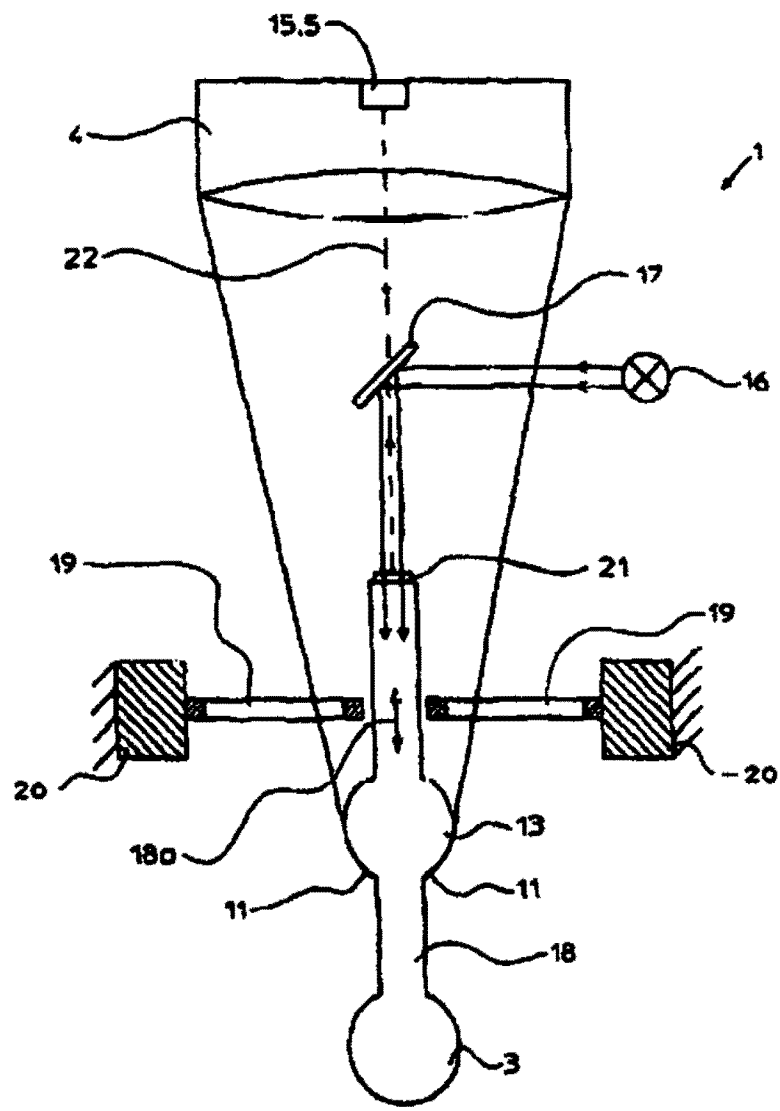
Figure 3A:
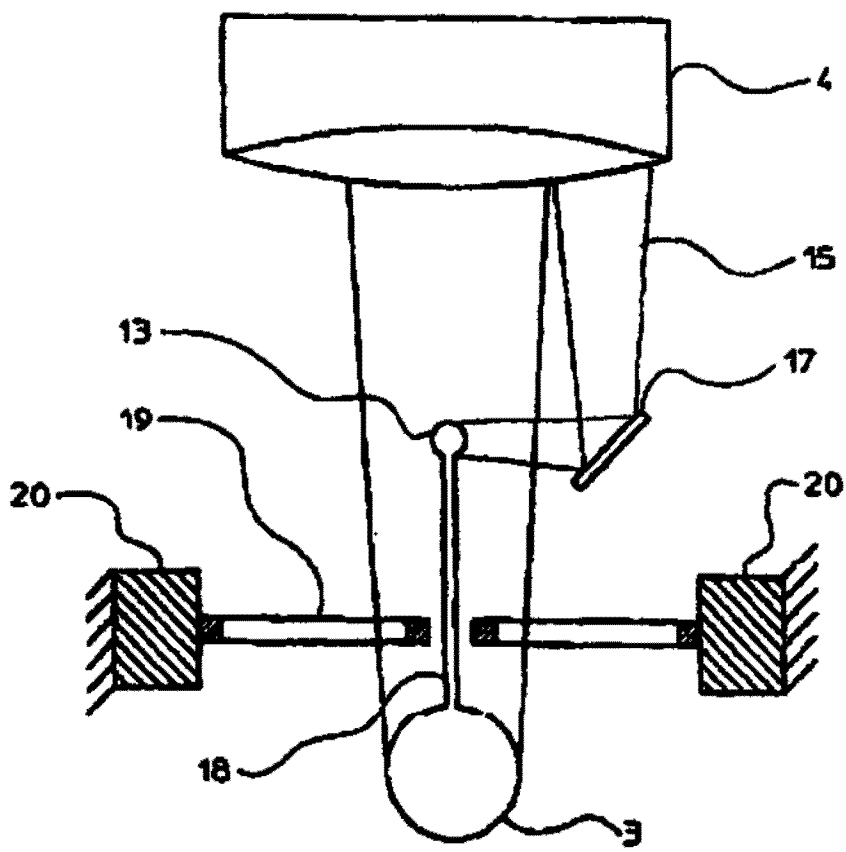
Figure 4:
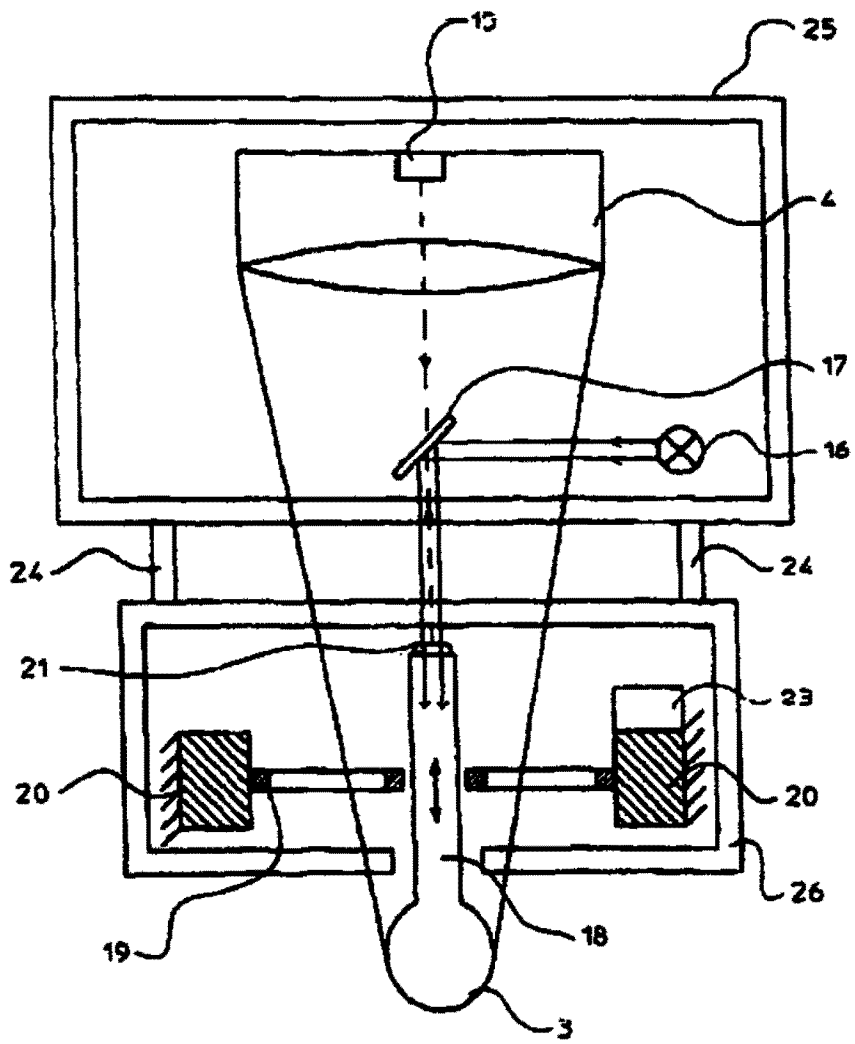
Figure 5:
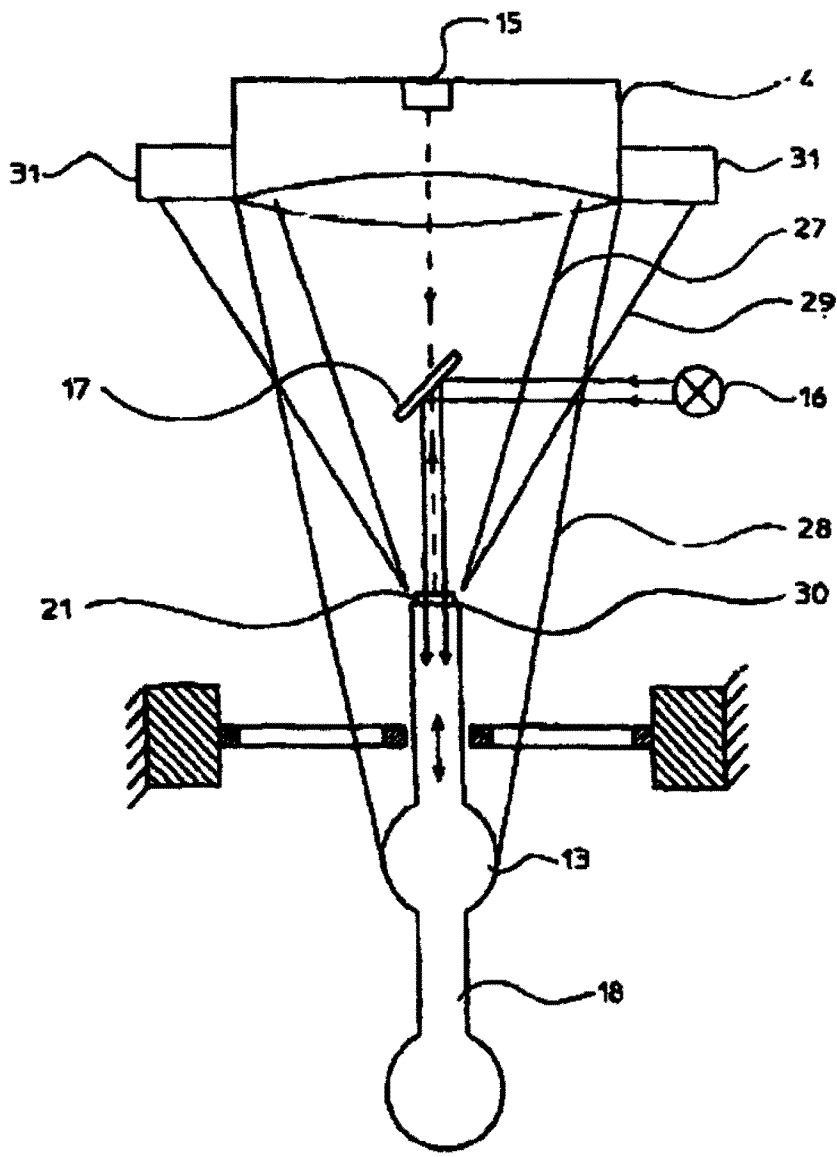
Figure 6:
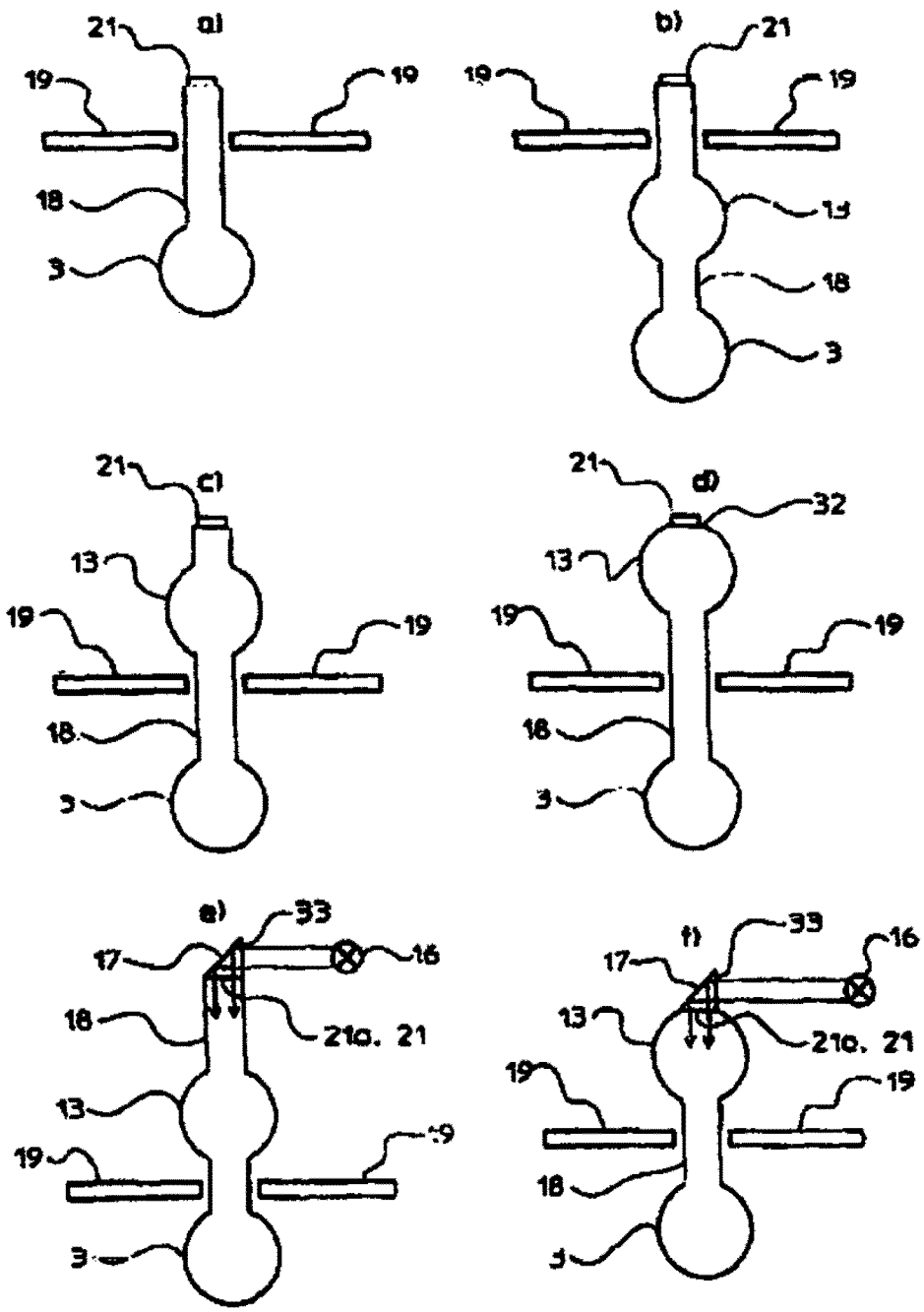
Figure 7:
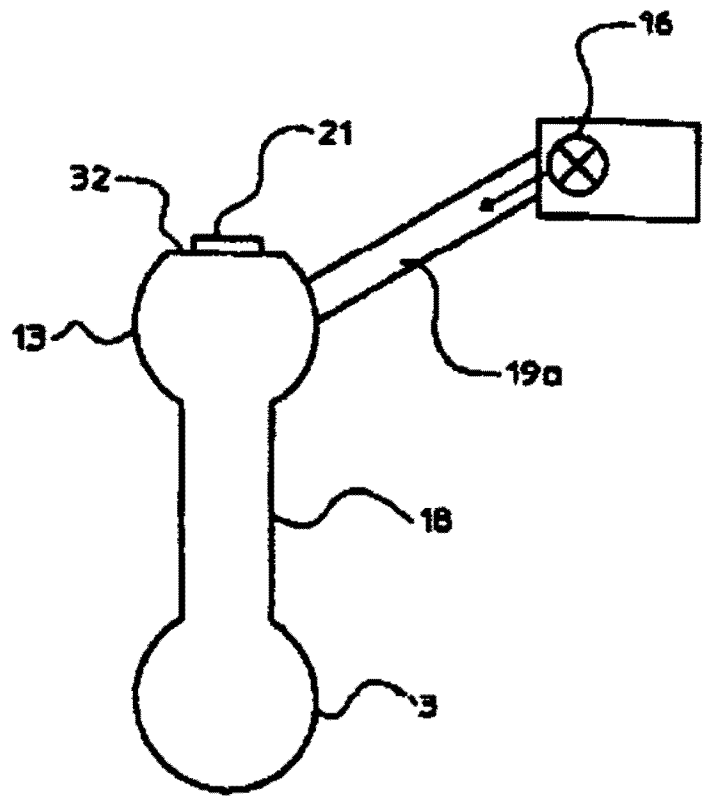
Figure 8:
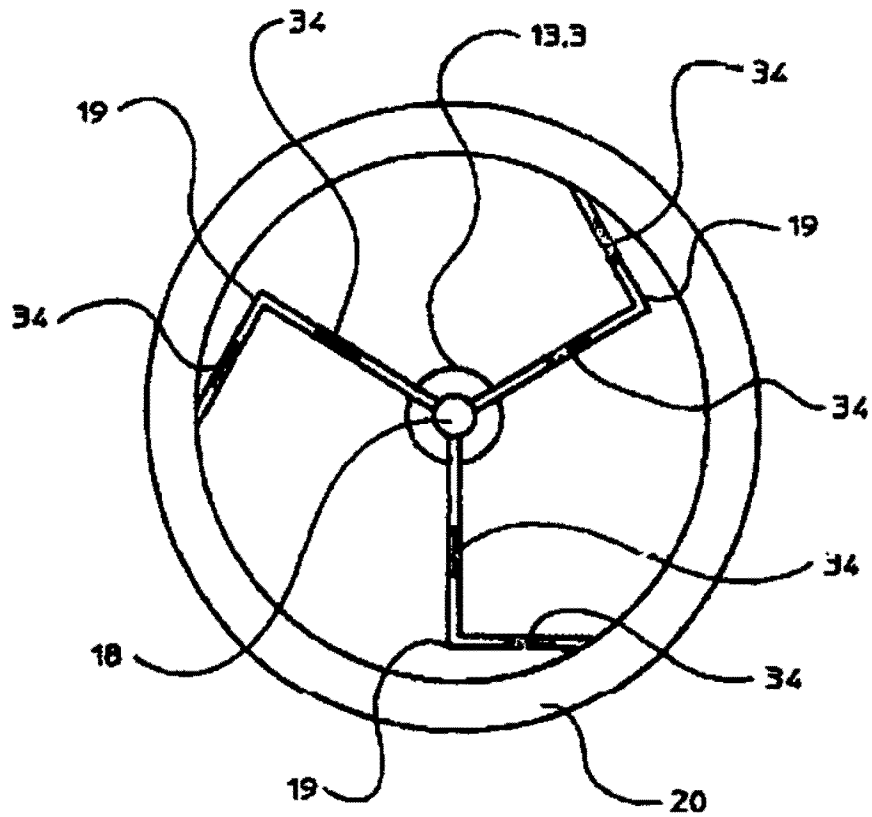
Figure 9:
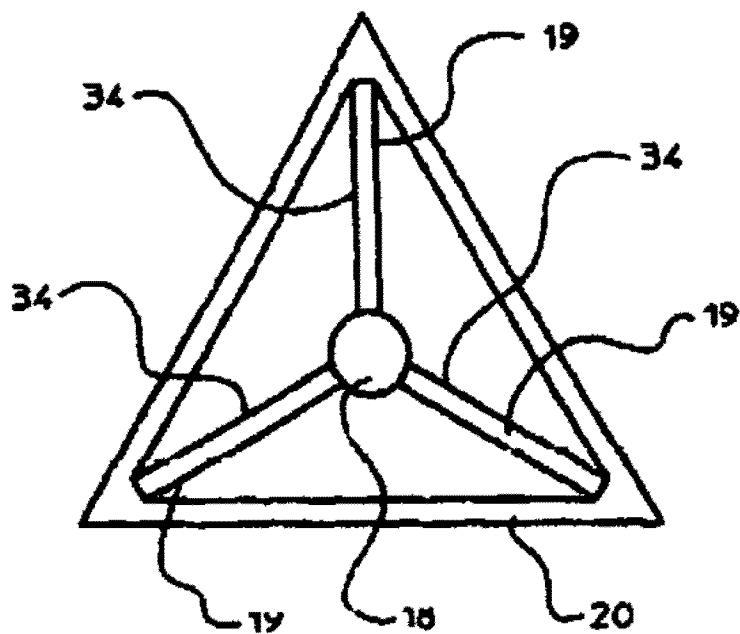
Figure 10:
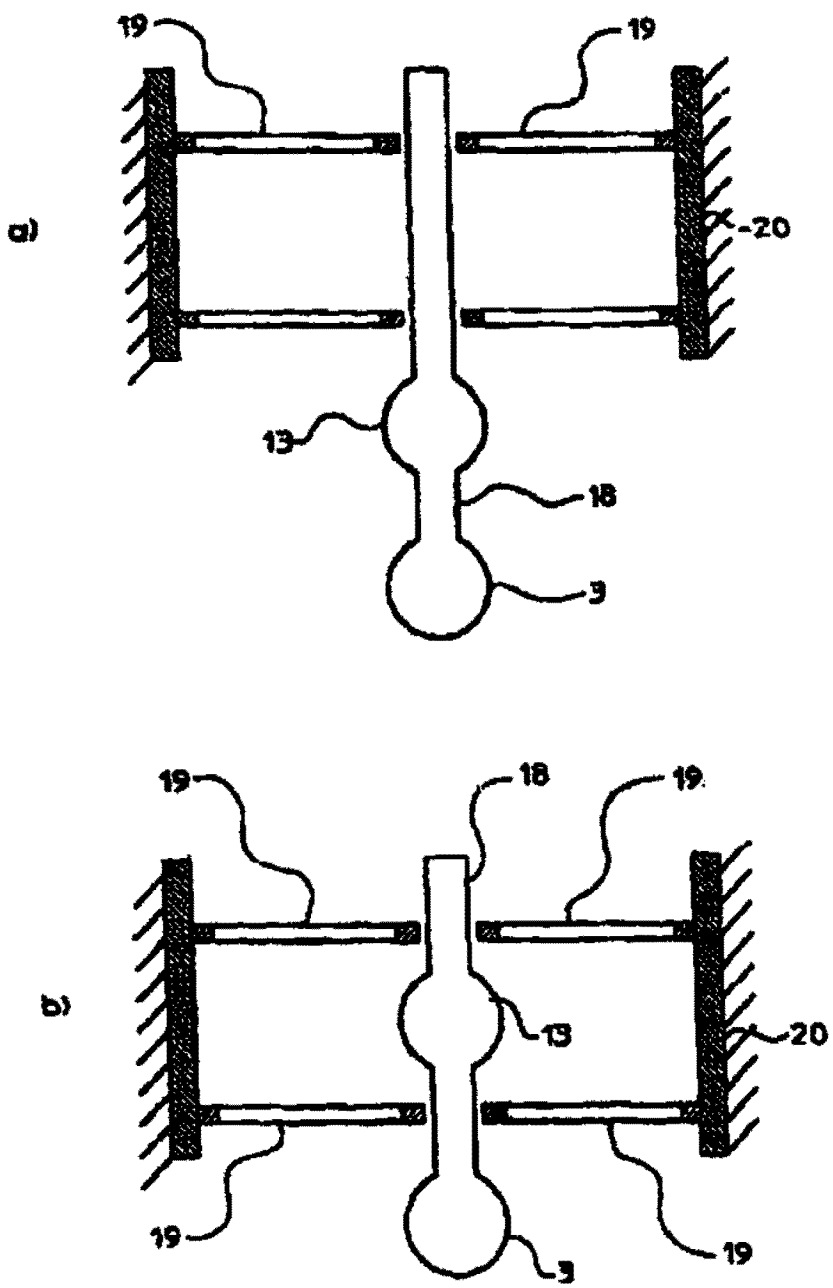
Figure 11:
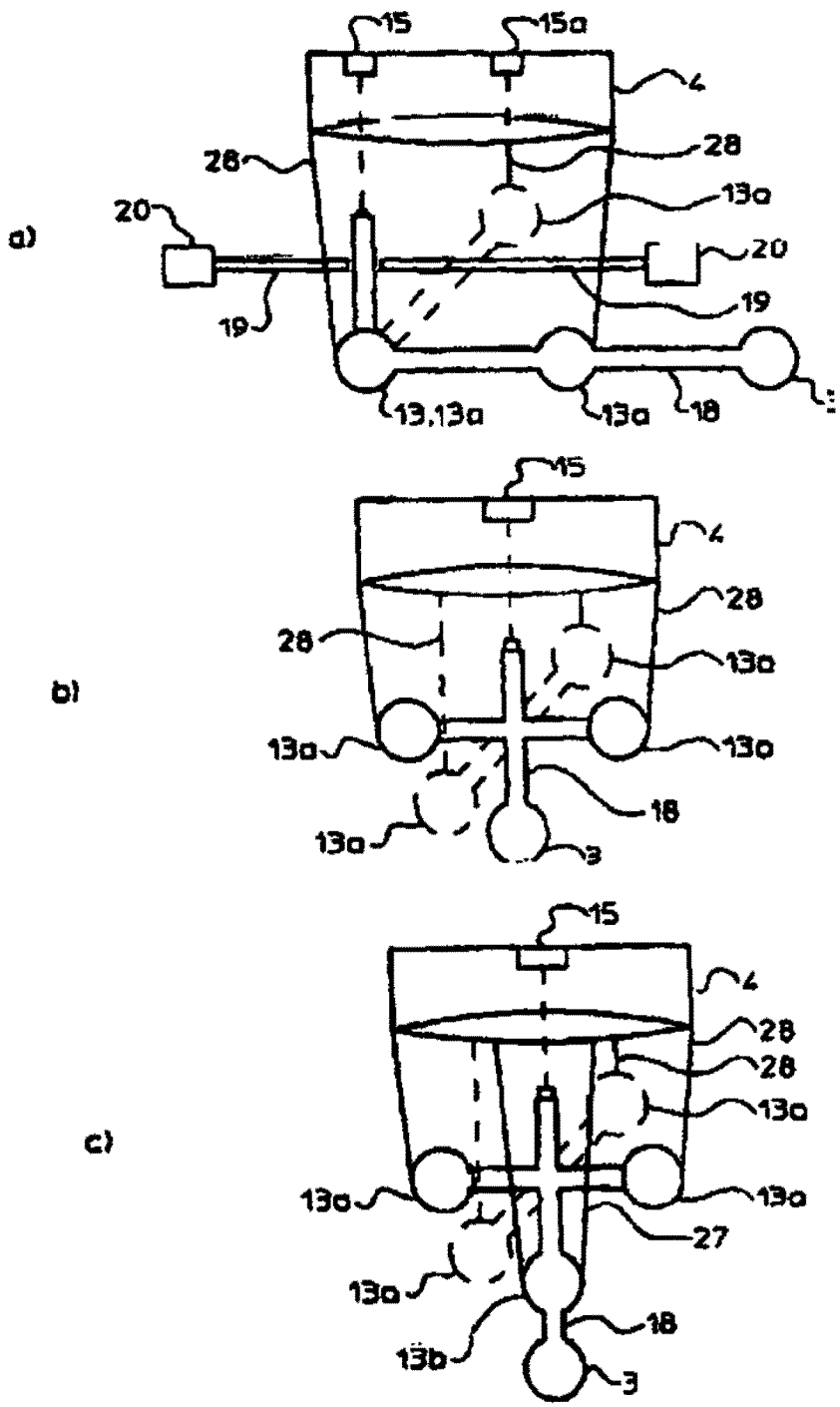

Further details, advantages and features of the invention result not only from the claims, the features to be gathered from them either individually and/or in combination but also from the following description of the preferred exemplary embodiments to be gathered from the drawings, in which:

FIG. 1 shows a first embodiment of an arrangement of a tactile, optical measuring system, FIG. 2 shows a second embodiment of an arrangement of a tactile, optical measuring system, FIG. 3 shows another embodiment of an arrangement of a tactile, optical measuring system with flexible connecting elements, FIG. 3a shows another embodiment of an arrangement of the tactile, optical measuring system with flexible connecting elements and a spherical mark, FIG. 4 shows another embodiment of an arrangement of a tactile, optical measuring system with change interface and piezo-oscillator, FIG. 5 shows another embodiment of an arrangement of the tactile, optical measuring system with two working distances of an image processing sensor and a dark field illumination, FIG. 6 shows various embodiments of an arrangement of touching form element, mark and flexible connecting elements, FIG. 7 shows another embodiment of a fastening and for coupling light into a mark associated with a touching form element, FIG. 8 shows a first embodiment of flexible connecting elements and a holding structure, FIG. 9 shows a second embodiment of flexible connecting elements and a holding structure, FIG. 10 shows a third embodiment of flexible connecting elements and a holding structure, FIG. 11a-c shows different embodiments of an arrangement of several marks to be detected, and FIG. 12 shows a basic view of a coordinate measuring device.

In the following description of several embodiments in accordance with the invention basically the same reference numerals are used for the same elements so that in the following association between the elements and the reference numerals takes place:

1—tactile optical measuring system
2—feeler extension
3—touching form element
4—image processing sensor
5—interferometric measuring system 6—holder of the feeler extension
7—coupling
8—change interface
9—measuring beam of the interferometric measuring system 5
10—optical waveguide
11—reflecting layer
12—reference radiation of the interferometric measuring system 5
13—mark
13a—mark
13b—mark
14—reflection layer
15—distance sensor
15a—distance sensor
16—illumination
17—neutral deflection- and divider layer
18—shaft
18a—arrow symbolizing the direction of the axis of the shaft 18
19—flexible connecting elements
19a—flexible connecting element
20—holding structure
21—color-selective layer
21a—connection position of prism 33 to shaft 18 or mark 13 or touching form element 3
22—measuring beam of the distance sensor 15
23—piezo-oscillator
24—change interface
25—sensory mechanism and illumination unit
26—touching unit
27—working distance of a second radiation or of a second beam path
28—working distance of a first radiation or of a first beam path
29—dark field illumination
30—top of the shaft 18
31—light sources for dark field illumination
32—flattened top of mark 13 or of touching form element 3
33—prism
34—mechanical electrical sensor elements FIG. 1 shows a tactile, optical measuring system 1 in accordance with the invention comprising a feeler extension 2 such as an optical fiber or optical waveguide, a touching form element 3 fastened to the latter, an image processing sensor 4 and an interferometric measuring system 5. A holder 6 of the feeler extension 2 is connected via a coupling 7 to the interferometric measuring system 5 and detachably connected in an indirect manner via the change interface 8 to the image processing sensor 4. The image processing sensor 4 detects the position of the touching form element 3 optically in two directions, namely, in the exemplary embodiment in the plane that vertically intersects the plane of the drawing and runs horizontally. A measuring beam 9 of the interferometric measuring system is coupled to an end of the optical waveguide 10, that forms the feeler extension 2, and is reflected on the touching form element 3. The touching form element 3 is provided to this end on the bottom 11 with a reflecting layer. After the reflection the measuring beam runs in the opposite direction back through the optical waveguide 10 into the interferometric measuring system 5 and interferes with a reference radiation 12 of the interferometer 5. The absolute position in the measuring direction of the interferometer, that is, the vertical in the drawing, is determined by the design of the interferometric measuring system 5 as a heterodyne interferometer. As a result, the deflection of the touching form element 3 upon touching an object of measurement such as a workpiece is determined.

FIG. 2 shows the tactile, optical measuring system 1 in accordance with the invention in a basic fashion, that additionally has a mark 13 associated with the touching form element 3. Instead of the position of the touching form element 3, the position of the mark 13 is now determined with at least one of the two measuring systems 4 and 5. The determination of the position of the mark with the interferometric measuring system 5 takes place by reflection of the measuring radiation 9 on a reflection layer 14 that is introduced in the optical waveguide 10 in the vicinity of the mark. The reflection layer 14 is produced by a separately introduced, reflecting layer or by the transition to another material.

FIG. 3 shows another embodiment of the tactile optical measuring system 1 comprising the image processing sensor 4, consisting at least of an imaging lens and camera such as a CCD or CMOS camera, with integrated distance sensor 15 or an interferometric measuring system 5, illumination 16, neutral deflection- and divider layer 17, shaft 18, color-selective layer 21, touching form element 3, mark 13, flexible connecting elements 19 and holding structure 20. The axis of the shaft 18 runs in the drawing plane along the arrow 18a and corresponds approximately to the main axis of the optical sensory mechanism, that is, image processing sensor 4, interferometric measuring system 5 and distance sensor 15. The distance sensor 15 has a partially common beam path with the image processing sensor 4. The touching form element 3 and the mark 13 are connected here to the shaft 18, that is fastened by adhering or splicing on the flexible connecting elements 19 emanating from the holding structure 20.

Furthermore, the color-selective layer 21 is present on the upper end of the shaft 18 and allows a light component coming from the light source 16, which component was reflected on the neutral deflection- and divider layer 17, to be transmitted and that reflects a component of the radiation of the measuring beam 22 of the distance sensor 15 that transmits the divider 17.

The color-selective layer 21 is distinguished by a wavelength-selective reflection- and transmission behavior. Thus, for example, a radiation with wavelengths above about 550 nm to 600 nm is reflected and radiation with wavelengths below about 500 nm to 600 nm is allowed to pass through. The light of light source 16 coupled into the shaft 18 is reflected on a reflecting layer 11 on the bottom of mark 13 and is detected by the image processing sensor 4. The flexible connecting elements 19 are so narrow and/or constructed with recesses to this end that sufficient light reaches the image processing sensor 4, as is also shown in FIGS. 8 and 9. Upon contact of the touching form element 3 with the object of measurement the image processing sensor 4 then detects the deflection of the mark 13 in the two directions lying almost at a right angle to the axis 18a of the shaft 18 and the distance sensor 15 detects the deflection of the color-selective layer 21 in the direction of the axis 18a of the shaft 18, which corresponds approximately to the deflection of the touching form element 3 in the direction of the shaft 18. In order to separate the beam paths of the image processing sensor 4 and of the distance sensor 15 after the reflection on the layers 11 and 21 for evaluation, another color-selective layer is used that is located inside the common beam path of image processing sensor 4 and distance sensor 15 and is not shown in the figure. A FIG. 3a shows the tactile optical measuring system 1 in an embodiment in which the distance sensor 15 is formed by a part of the measuring radiation of the image processing sensor 4 or by another image processing sensor. The position of the mark 13, constructed spherically for the measuring with image processing, is determined in the direction of the shaft 13 and optionally vertically to it by beam deflection on the mirror 17. In addition, even another beam path can be used by another image processing sensor by further splitting off image processing sensor 4 by another deflection mirror with which even the lacking position information of the mark 13 is determined which runs in the FIG. 3a along the horizontal of the drawing plane. The deflection takes place vertically to the direction of the shaft 18 and vertically to the direction of the radiation running after the deflection mirror 17 and strikes the mark 13, that is, vertically to the drawing plane of FIG. 3a.

FIG. 4 shows another embodiment of an arrangement of the tactile, optical measuring system 1 in which the touching form element and the color-selective layer 21 are present on the shaft 18. In order to put at least the touching form element 3 in mechanical oscillations a piezo-oscillator 23 is present, for example, on the holding structure 20. However, it can also be fastened at another position such as, for example, in the vicinity of the change interface 24.

The change interface 24 makes it possible to design the touching unit 26, consisting, for example, of shaft 18 with color-selective layer 21 and touching form element 3 fastened on flexible connecting element 19 and of holding structure 20 and piezo-oscillator 23 and any front lens to be used (not shown), which lens can be arranged, for example, directly above the color-selective layer 21 in a detachable manner from the sensory mechanism and illumination unit 25, consisting, for example, of illumination 16, neutral deflection layer and divider layer 17 and image processing sensor 4 with integrated distance sensor 15.

FIG. 5 shows another embodiment of an arrangement of the tactile, optical measuring system in which an image processing is carried out in two different working distances 27, 28 of the radiation. The first beam path detects in the working interval 28 the positional change of the mark 13 at a right angle to the axis 18a of the shaft 18. The second beam path detects in the working interval 27 the positional change of a second mark at a right angle to the axis 18a of the shaft 18 that is formed by the color-selective layer 21 or the top 30 of the shaft 18 or of its edges. The illumination of this second mark such as layer 21 takes place by a dark field illumination 29 that emanates from several light sources 31, or from a bright field illumination integrated in the beam path of the image processing sensor 4 as produced by the illumination 16 and the neutral deflection layer and divider layer 17 or by the dark- and the bright field illuminations.

The image processing sensor 4 contains a lens with a changeable working distance or two cameras that are focused on the two working distances 27, 28 for evaluating the two beam paths for the working distances 27 and 28, whereby an at least partially common image lens is preferably used. The tilting of the shaft 18 about the two axes running vertically to the axis 18a of the shaft 18 is determined from the determination of the two position changes of the marks 13 and 30 and/or 21.

Alternatively, the different working distances of the image processing sensory mechanism can be used to on the one hand to detect the position change of the mark 13 and on the other hand to merely observe the top 30 of the shaft 18 in order, for example, to carry out the alignment of the distance sensor with the top 30 of the shaft 18.

FIG. 6 shows different embodiments of the arrangement of touching form element 3, mark 13 and flexible connecting elements 19 by which the shaft 18 is connected to the holder or holder structure 20. The connecting elements 19 are accordingly always located above the touching form element 3 as is shown, for example, in FIG. 6 a), selectively also above or below the mark 13, as shown in the FIGS. 6 b) and 6 c).

The distance of the flexible connecting elements 19 to the top 30 of the shaft 18 is preferably selected to be very small, e.g., 5 mm or 2 mm or 1 mm or especially preferably 0 mm in order to keep as small is possible the lateral deflection of the layer 21 serving as reflection layer for the distance sensor during the deflection of the touching form element 3.

FIG. 6 d) shows an alternative arrangement of the color-selective layer 21 on the flattened surface 32 of the mark 31. An arrangement of the color-selective layer 21 on the flattened surface of the touching form element 3 is alternatively possible.

An alternative arrangement of a neutral deflection- and divider layer on a prism 33 can be gathered from FIGS. 6 e) and f), which prism is connected to the shaft 18 or to the mark 13. The color-selective layer 21 is located on the appropriate connecting position 21a and is supplied on the upper end of the shaft 18 or the bottom of the prism 33.

FIG. 7 shows an alternative fastening of the shaft 18. A flexible connecting element 19a is fastened to this end laterally on the mark 13, e.g., adhered or spliced on or forms a unit with the mark 13. Alternatively, the flexible connecting element 19a can also be fastened on the shaft 18 or the touching form element 3 in the same manner. The touching form element 3 or, as shown in the figure, the mark 13 has a flattened top 32 for the color-selective layer 21. Alternatively, a light source 16 is fastened on the flexible connecting element 19a that couples light into the mark 13 or into the touching form element 3 or into the shaft 18, as a result of which the position of the mark 13 or of the touching form element 3 can be evaluated with the image processing sensor. In this instance the layer 21 can also be designed to be non-color-selective, thus, it reflects all light.

FIG. 8 shows a preferred embodiment of the flexible connecting elements 19 and of a holder structure 20 in a top view, that is, in the direction of the axis of the shaft 18. The measuring with the image processing sensor 4 can optically penetrate through the plane of the flexible connecting elements 19 and take place almost uninfluenced by the flexible connecting elements 19 by virtue of the narrow construction of the flexible connecting elements 19 and their arrangement outside of the focus plane of the image processing sensor 4. The arrangement and dimensioning of the flexible connecting elements 19 additionally makes possible an almost equal mechanical stiffness in the deflection of the touching form element 3 in at least two or also three axes. Moreover, preferably six mechanical, electrical sensor elements 34 such as, for example, wire strain gauges or piezo-resistive sensor elements are additionally selectively applied on the flexible connecting elements 19 or integrated into them in order to make possible a determination of the movement of the touching form element in one or more degrees of freedom in addition to the measuring with the image processing sensor 4.

FIG. 9 shows a second embodiment of the flexible connecting elements 19 and of the holder structure 20. Mechanical, electrical sensor elements 34 can also be selectively applied on the flexible connecting elements 19 or integrated into them.

Another embodiment of the flexible connecting elements 19 and of holder structure 20 can be recognized from FIG. 10, in which the flexible connecting elements 19 are arranged superposed in two planes and connected to the shaft 18. The corresponding parallel spring guidance ensures that upon the deflection of the touching form element 3 in the direction of the axis 18a of the shaft 18 almost no shifting of the touching form element 3 and of the shaft 18 takes place in the directions transversally to the axis 18a of the shaft 18. Also, all rotary degrees of freedom can be blocked by the appropriate dimensioning of the flexible connecting elements 19. The arrangement of the flexible connecting elements 19 takes place completely above the optionally present mark 13, as FIG. 10 a) illustrates, or partially between the mark 13 and the touching form element 3, as FIG. 10 b) shows. Alternatively, an arrangement of the flexible connecting elements 19 completely below the mark 13 is also possible.

FIG. 11 shows embodiments of the arrangement of several marks 13a to be detected. These marks are detected at the same time by the first beam path 28 of the image processing sensor 4 with a large field of vision, as can be recognized in FIGS. 11 a), b) and c). As a result, in addition to the lateral shift transversely to the axis of the shaft 18 the rotation of the touching form element 3 about the axis 18a of the shaft 18 can be determined. Additionally, a distance sensor 15 can be used, as shown in FIG. 11 a), that determines the deflection of the mark 13 in the direction of the axis 18a of the shaft 18. Also, the deflection transversely to the axis 18a of the shaft can be determined by focusing of the mark 13b with a working distance deviating from the second beam path 27 by the image processing sensor 4 (see FIG. 11 C).

The determination of the deflection of the marks 13a can (see FIG. 11 a) also take place with one or more other distance sensors 15a integrated in the image processing sensor 4, for example, with an autofocus sensor that uses the same beam path as the image processing sensor 4 and preferably the measured values of at least one or more parts of the sensor area of the camera of the image processing sensor 4. As a result thereof, the tiltings of the shaft 18 and of the touching form element 3 about the axes lying at a right angle to the axis 18a of the shaft 18 are determined. As FIG. 11 a) shows, the touching form element 3 is arranged on the side in order to make possible measurings of undercuts or horizontally lying geometries. Alternatively, appropriate lateral prolongations can be attached on all marks 13a.

FIG. 12 shows a purely basic embodiment of a multi-sensor coordinate measuring device 130. The sealings can be selectively mounted or dismounted or automatically replaced via corresponding sensor replacement systems even during the operation. Of course, the invention is not departed from if an appropriate number of selected sensors is left firmly mounted on the device in order to measure objects in this configuration.

Independently of the above, the sensory mechanism comprises at least one sensor, also designated as the first sensor, for carrying out an optically lateral measuring method, that is, in particular a 2-D image processing sensor. This should detect the lateral deflection of a touching form element or of a mark associated with the latter during the measuring of a workpiece 116, as was previously described. Furthermore, the sensory mechanism comprises a distance sensor, in particular in the form of an absolutely measuring heterodyne interferometer in order to measure the touching form element or the mark associated with the latter in the Z direction of the coordinate measuring device, i.e., the position of the touching form element or of the mark.

The principle of a coordinate measuring device 130, that is sufficiently known and reproduced once again in FIG. 12, comprises a base frame 112 consisting, e.g., of granite, with the measuring table 114 on which the object of measurement (workpiece 116) is positioned in order to measure its surface properties.

A gantry 119 can be adjusted along the base frame 112 in the Y direction. To this end columns or posts 120, 122 are slidingly supported on the base frame 112. A traverse 124 runs from the columns 120, 122 along which traverse a carriage can move that for its part receives a spindle sleeve or column 126 that can be adjusted in the Z direction. A tactile sensor 30 starts from the spindle sleeve 126 or optionally from a change interface 128 connected to the spindle sleeve 126 in order to tactilely and optically measure with inclusion of the image processing sensor 130. However, to this extent sufficiently known techniques are referred to. Furthermore, the distance sensor is located in the spindle sleeve 126.

The basic view of FIG. 12 does not show the holder, comprising the flexible connecting elements, for the tactile sensor 130, that can be connected via the holder to the change interface 128.

The invention claimed is:

1. A method for the determining of structures and/or geometry of an object such as a workpiece in a coordinate measuring device by a tactile, optical measuring method, whereby the position of a touching form element or at least of a mark associated with the latter is determined in at least one direction such as the X and/or Y direction of the coordinate measuring device by a first sensor with an optically laterally measuring method using a 2-D image processor, and the position of the touching form element or at least of the mark associated with the latter is determined in at least one second direction such as the Z direction of the coordinate measuring device with at least one distance sensor, characterized in that the touching form element and the optionally at least one mark associated with the latter emanate from a shaft, and in order to
fasten the shaft in a holder, at least one flexible connecting element is used that is passed through by the beam path of the first sensor in the direction of the beam and that the at least one flexible connecting element is transparent and/or is arranged in a strongly defocused manner relative to the first sensor.

2. The method according to claim 1, characterized in that a sensor from the group of interferometer, laser distance sensor, sensor according to the focus principle, autofocus sensor, image processing sensor is used as distance sensor.

3. The method according to claim 1, characterized in that the flexible connecting elements are connected by an annular holder structure.

4. The method according to claim 1, characterized in that different marks, preferably at different vertical distances, are used for the lateral determination of the position of the touching form element or at least of the mark associated with the latter with the optically laterally measuring method and for the determination of the position of the touching form element or at least of the mark associated with the latter in the second, such as the vertical direction with the distance sensor.

5. The method according to claim 1, characterized in that the position of the touching form element or at least of the mark associated with the latter is determined in at least one direction by detecting the side of the touching form element which side faces a sensory mechanism used for the measuring or the associated mark.

6. The method according to claim 1, characterized in that the position of the touching form element or at least of the mark associated with the latter is determined in at least one direction by detecting the shaft carrying the touching form element and the optionally present mark.

7. The method according to claim 5, characterized in that a layer such as a reflection layer is provided on the side of the touching form element facing a sensory mechanism that makes possible at least the optically laterally measuring method or on the associated mark.

8. The method according to claim 7, characterized in that a reflection layer with color-selective properties is used that are designed in such a manner that measuring radiation of a wavelength of the sensor used for determining the at least one direction is reflected and preferably additional radiation of a light source with deviating wavelength is transmitted.

9. The method according to claim 5, characterized in that the touching form element and/or the at least one associated mark and/or the reflection layer facing the sensory mechanism is/are illuminated by a transillumination or by self-illumination or by bright field illumination and/or dark field illumination associated with the image processing sensor or by the measuring radiation of the distance sensor or of the interferometer.

10. The method according to claim 1, characterized in that during the illumination by self-illumination of the touching form element or of the mark associated with the latter by coupling light into the touching form element or into the mark or the shaft the side of the coupling in facing the sensory mechanism is coated with a color-selective layer.

11. The method according to claim 1, characterized in that during the illumination by self-illumination of the touching form element or of the mark associated with the latter by coupling light into the touching form element or into the mark or the shaft an optically preferably neutral divider layer or deflection layer is arranged above or on the upper shaft end.

12. The method according to claim 1, characterized in that when using different wavelengths in evaluation beam paths used for the measuring, a separation of the wavelengths takes place by mechanical filters such as color-selective layers and/or interference filters.

13. An arrangement for the determining of structures and/or geometry of an object such as a workpiece in a coordinate measuring device with a tactile, optical measuring method, whereby a distance sensor determining the position of a touching form element (3) or at least of a mark (13) associated with the latter in at least one direction such as the X direction and/or Y direction of the coordinate measuring device by an optically laterally measuring method detecting a first sensor, and at least one distance sensor (15) that detects the position of a touching form element or at least of the mark associated with the latter in at least one second direction such as the Z direction of the coordinate measuring device are coupled, characterized in that the touching form element (3) and the optionally at least one mark (13) associated with the latter emanate from a shaft, wherein said shaft is fastened via at least one flexible connecting element (19), that the connecting element can be penetrated by the beam path of a first sensor (4) used for carrying out the optically laterally measuring method in the direction of the beam, and that the at least one connecting element is transparent and/or is arranged in a strongly defocused manner relative to the first sensor.

14. The arrangement according to claim 13, characterized in that the first sensor used for the optically laterally measuring method is a 2-D image processing sensor (4).

15. The arrangement according to claim 13, characterized in that the distance sensor (15) is a sensor from the group of interferometer (5), laser distance sensor, sensor according to the focus principle, autofocus sensor, and image processing sensor.

16. The arrangement according to claim 13, characterized in that at least two flexible connecting elements (19) emanate from an annular holder structure (20).

17. The arrangement according to claim 13, characterized in that different marks (13a, 13b), preferably at different vertical distances, can be used for the lateral determination of the position of the touching form element (3) or at least of the mark (13) associated with the latter with the sensor (4) that carries out the optically laterally measuring method and for the vertical determination of the position of the touching form element or at least of the mark associated with the latter with the distance sensor (15).

18. The arrangement according to claim 13, characterized in that the touching form element (3) and/or at least the mark (13) associated with the latter emanate from the shaft (18) that is a feeler extension such as an optical fiber or optical waveguide that is flexible in at least one degree of freedom.

19. The arrangement according to claim 13, characterized in that a reflection layer (21) is provided on the touching form element (3) or near the touching form element or a mark (13) associated with the latter or on a shaft end facing the sensors (4, 15).

20. The arrangement according to claim 19, characterized in that the reflection layer (21) is formed by coating with a reflecting layer and/or introducing a material limit by variation of the material of the feeler extension.

21. The arrangement according to claim 19, characterized in that the reflection layer (21) is round and/or in the shape of an annular ring.

22. The arrangement according to claim 19, characterized in that the reflection layer (21) has color-selective properties.

23. The arrangement according to claim 13, characterized in that at least three flexible connecting elements (19) are arranged circularly, preferably at the same angular steps about the axis of the shaft (18) or at least one connecting element emanates laterally, preferably at an angle of 90 to 45° to the shaft axis facing in the direction of one of the sensors (4, 15), from the shaft axis or from the touching form element or from an associated mark.

24. The arrangement according to claim 13, characterized in that flexible connecting elements (19) are arranged in a plane above the touching form element (3) or above a first mark (13) and that at least one other mark is arranged above the flexible connecting elements that contains a reflection layer (21).

25. The arrangement according to claim 13, characterized in that flexible connecting elements (19) are arranged in a plane between a mark (13) and the touching form element (3) and that the mark contains a reflection layer (21).

26. The arrangement according to claim 13, characterized in that the following components are connected to each other: —a touching form element (3) connected to a shaft (18) and preferably at least one mark (13, 13a, 13b) associated with this touching form element, and —at least one connecting element (19) emanating from the shaft or the touching form element or the mark and flexible in at least one degree of freedom.

27. The arrangement according to claim 26, characterized in that an optical, preferably neutral divider layer or deflection layer (17) arranged above the touching form element (3) or the optionally associated mark (13, 13*a*, 13*b*) or the shaft (18) is connected to the components.

28. The arrangement according to claim 26, characterized in that a preferably color-selective layer (21) arranged on the touching form element (3) or on a mark (13, 13*a*, 13*b*) associated with the latter or on the shaft end (30) facing one of the sensors (4, 15) is connected to the components.

29. The arrangement according to claim 26, characterized in that at least one lens such as a front lens attachment is connected to the components.

30. The arrangement according to claim 13, characterized in that a touching form element (3) connected to a shaft (18) and preferably at least one mark (13) associated with this touching form element, and at least one connecting element (19*a*) emanating from the shaft or the touching form element or the mark and flexible in at least one degree of freedom are arranged in front of the sensory mechanism.

31. The arrangement according to claim 30, characterized in that the sensory mechanism consists of a neutral divider layer (17) and —a first branch connected to it and consisting of an illumination of the first wavelength and preferably of an imaging pattern, and —a second branch connected to it and consisting of —an imaging beam path of a first wavelength such as an image processing beam path with a first working distance and a first camera, which imaging beam path is separated by a color-selective layer (21), and —an imaging beam path of a second wavelength, which imaging beam path is separated by a color-selective layer (21) and is designed as a first or second image processing sensor with a second working distance and a second camera or is designed as a laser distance sensor (15) or is designed as an illumination beam path of a second wavelength.

32. The method according to claim 13, characterized in that the touching form element, or the associated mark, has a shape selected form the group consisting of needle-shaped, nearly spherical, tear-shaped, and partially flattened.

33. The method according to claim 30, characterized in that the touching form element, or the associated mark, has a shape that is partially flattened on a side facing the sensory mechanism.

* * * * *

UNITED STATES PATENT AND TRADEMARK OFFICE
CERTIFICATE OF CORRECTION

PATENT NO. : 9,599,456 B2
APPLICATION NO. : 13/512351
DATED : March 21, 2017
INVENTOR(S) : Christoph et al.

It is certified that error appears in the above-identified patent and that said Letters Patent is hereby corrected as shown below:

Please delete Patent No. 9,599,456 B2 in its entirety and insert Patent No. 9,599,456 B2 in its entirety as shown on the attached pages.

Signed and Sealed this
Ninth Day of April, 2019

Andrei Iancu
*Director of the United States Patent and Trademark Office*

(12) United States Patent
Christoph et al.

(10) Patent No.: US 9,599,456 B2
(45) Date of Patent: Mar. 21, 2017

(54) METHOD AND ARRANGEMENT FOR TACTILE-OPTICAL DETERMINATION OF THE GEOMETRY OF A MEASUREMENT OBJECT

(75) Inventors: Ralf Christoph, Giessen (DE); Matthias Andräes, Florstadt (DE); Ingomar Schmidt, Buseck (DE); Markus Hechler, Wetzlar (DE); Benjamin Hopp, Giessen (DE)

(73) Assignee: WERTH MESSTECHNIK GMBH, Giessen (DE)

( * ) Notice: Subject to any disclaimer, the term of this patent is extended or adjusted under 35 U.S.C. 154(b) by 1096 days.

(21) Appl. No.: 13/512,351

(22) PCT Filed: Nov. 26, 2010

(86) PCT No.: PCT/EP2010/068327
§ 371 (c)(1),
(2), (4) Date: Aug. 13, 2012

(87) PCT Pub. No.: WO2011/064339
PCT Pub. Date: Jun. 3, 2011

(65) Prior Publication Data
US 2012/0327221 A1   Dec. 27, 2012

(30) Foreign Application Priority Data

Nov. 26, 2009   (DE) .................. 10 2009 044 673
Dec. 23, 2009   (DE) .................. 10 2009 059 298
Mar. 24, 2010   (DE) .................. 10 2010 016 127

(51) Int. Cl.
G01B 11/00   (2006.01)
G01B 5/016   (2006.01)

(52) U.S. Cl.
CPC ............ *G01B 11/007* (2013.01); *G01B 5/016* (2013.01)

(58) Field of Classification Search
CPC .. H04N 7/18; A61B 5/06; A61B 5/227; A61B 5/4337; A61B 5/6847; A61B 5/7264
See application file for complete search history.

(56) References Cited

U.S. PATENT DOCUMENTS

| 5,825,666 A | 10/1998 | Freifeld |
| 2004/0118000 A1 | 6/2004 | Roth et al. |

(Continued)

FOREIGN PATENT DOCUMENTS

| CN | 101553707 | 10/2009 |
| DE | 10108774 A1 | 9/2002 |

(Continued)

OTHER PUBLICATIONS

Chinese Search Report dated Dec. 2, 2014, corresponding to Chinese Appln. 201080062452.2.
Japanese Office Action dated Apr. 4, 2014, corresponding to Japanese Appln. 2012-540443.

(Continued)

*Primary Examiner* — Dave Czekaj
*Assistant Examiner* — Kehinde O Abimbola
(74) *Attorney, Agent, or Firm* — Ladas & Parry LLP

(57) ABSTRACT

The invention relates to a method and arrangement for determining structures and/or geometry of a workpiece in a coordinate measuring machine by means of a tactile-optical measuring method, wherein the position of a shaped probe element is determined in at least one direction by means of a first sensor using an optically lateral measuring method, and the position of the shaped probe element is determined in at least one second direction using at least one distance sensor. In order to allow the error-free detection of the shaped probe element using the sensors, the invention proposes that at least one flexible connector element is used in a mounting for fastening the shaped probe element, permeated by the beam path of the first sensor in the beam direction, wherein the connecting element is transparent (Continued)

and/or is disposed severely out of focus with respect to the first sensor.

33 Claims, 13 Drawing Sheets

(56) References Cited

U.S. PATENT DOCUMENTS

| | | | |
|---|---|---|---|
| 2005/0000102 A1* | 1/2005 | Christoph et al. | 33/503 |
| 2005/0259271 A1* | 11/2005 | Christoph | 356/601 |
| 2006/0007449 A1* | 1/2006 | Christoph et al. | 356/601 |
| 2006/0209379 A1* | 9/2006 | Guscho | 359/245 |
| 2007/0040107 A1* | 2/2007 | Mizota et al. | 250/221 |
| 2007/0043508 A1* | 2/2007 | Mizota et al. | 702/19 |
| 2008/0075227 A1* | 3/2008 | Christoph et al. | 378/23 |
| 2010/0014099 A1* | 1/2010 | Christoph et al. | 356/602 |
| 2010/0145653 A1* | 6/2010 | Christoph et al. | 702/152 |
| 2010/0253931 A1 | 10/2010 | Meier et al. | |

FOREIGN PATENT DOCUMENTS

| | | |
|---|---|---|
| DE | 10 2005 037 160 | 2/2007 |
| JP | H10054833 A | 2/1998 |
| JP | 2004-521339 | 7/2004 |
| JP | 2002-503339 | 12/2005 |
| WO | 0225206 A1 | 3/2002 |

OTHER PUBLICATIONS

Chinese Office Action dated Jan. 26, 2016, corresponding to Chinese Application. 201080062452.2.

\* cited by examiner

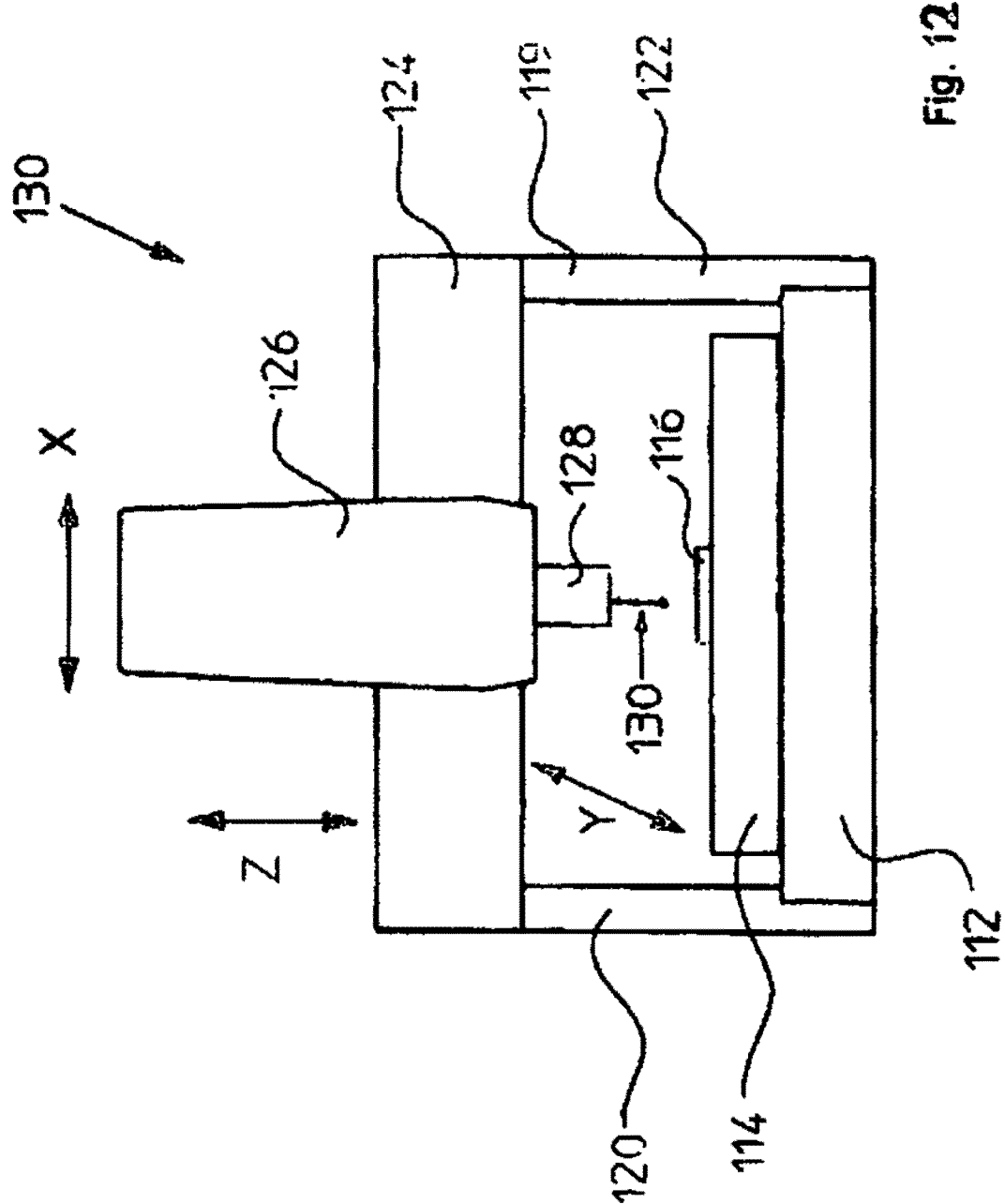

METHOD AND ARRANGEMENT FOR TACTILE-OPTICAL DETERMINATION OF THE GEOMETRY OF A MEASUREMENT OBJECT

The invention relates to a method for the determining of the geometry of an object of measurement by a tactile, optical measuring method. The invention also relates to an arrangement for the determining of structures and/or geometry of an object such as a workpiece with a tactile, optical measuring method.

In particular, the invention relates to a method for the determining of structures and/or geometry of an object such as a workpiece in a coordinate measuring device by a tactile, optical measuring method, whereby the position of a touching form element or at least of a mark associated with the latter is determined in at least one direction such as the X and/or Y direction of the coordinate measuring device by a first sensor with an optically laterally measuring method and the position of the touching form element or at least of the mark associated with the latter is determined in at least one second direction such as the Z direction of the coordinate measuring device with at least one distance sensor, and relates to an arrangement for the determining of structures and/or geometry of an object such as a workpiece in a coordinate measuring device with a tactile, optical measuring method, whereby an optically laterally measuring method that detects the position of a touching form element or at least of a mark associated with the latter in at least one direction such as the X and/or the Y direction of the coordinate measuring device by a first sensor and at least one distance sensor that detects the position of a touching form element or at least of the mark associated with the latter in at least one second direction such as the Z direction of the coordinate measuring device are coupled.

According to EP-B-1 082 581 a structure of an object is measured by a touching form element associated with a coordinate measuring device, the position of which touching form element is determined by an optical sensor. It consequently concerns a tactile, optical measuring method. In it, the sensor and the feeler are constructed as a unit that can be adjusted in common. This can be carried out according to WO-A-02/025206 by a rotary pivotable articulation. Reference is expressly made to the disclosures in these documents. The spatial position of a feeler is determined by two optical sensors in DE-U-298 08 683 of which the one measures the Z coordinate and the other one the X, Y coordinates. The same results from the DE. J.: tm-Technisches Messen 66 (1999) 12, pp. 1-5, Schwenke et al.: "Opto-Tactile Sensor for the 2-D and 3-D Measuring of Small Structures with Coordinate Measuring Devices".

In the previously known optical, tactile measuring systems known in the prior art as fiber feelers, the 3-dimensional detection of a touching form element or of a mark associated with the latter takes place by one or several one-dimensional or two-dimensional optical measuring systems arranged almost vertically relative to each other such as CCD- or CMOS image detection devices or from the combination of a two-dimensional image detection device and of a one-dimensional, relatively measuring distance sensor such as a homodyne interferometer (WO-A-2007/033811) or on the basis of a speckle image evaluation (DE-A-10 2005 021 645).

A 3-D feeler developed at the "National Physical Laboratory" (NPL) shows an almost isotropic behavior of the touching force but only for a stiff touching pin and while using piezoelectric evaluation systems for the determination of the tipping and deflection of the touching pin. The deflection is calculated in the three spatial directions from 6 measured bends or expansions of thin, rectangular sensor elements and the tipping around the latter calculated (Prof. Richard Leech, NPL, United Kingdom—"Development of a 3D vibrating micro-CMM probe using an active triskelion flexure" on "Microparts" Interest Group Workshop, Oct. 28-29, 2009, National Physical Laboratory, Teddington, UK).

A 3-D microfeeler marketed by the company "XPRESS Precision Engineering" has a similar function. The stiff feeler pin is fastened in it on a silicon chip and the deflection determined with the aid of piezoresistive elements that are integrated in the silicon chip (Ernst Treffers, Director Business Development, Xpress Precision Engineering, The Netherlands—"Gannen series: 3D tactile probes for microparts" on "Microparts" Interest Group Workshop, Oct. 28-29, 2009, National Physical Laboratory, Teddington, UK and internet site www.xpresspe.com and www.xpresspe.com/probe2.html on Dec. 16, 2009). An areally light-permeable holder for a tactile touching head is known from DE-A-101 08 774. The holder makes it possible with an observation camera arranged above the touching head to observe the tip of the touching pin through the carrier component necessary for the fastening and evaluation of the deflection of a touching pin in order to follow the tactile measuring, in particular the approach to the workpiece surface, which is otherwise difficult to observe. The observation camera cannot be used to measure the position of the touching tip and thus contains no means for image processing.

The known methods have the disadvantage that the relative or absolute position of the element to be detected such as a touching form element or a mark associated with the latter cannot be optically detected or only detected in an insufficiently precise or rapid manner.

In particular, the problem is not solved here that a rapid evaluation of the relative or absolute position of the element to be detected takes place in the imaging direction of the optical image detection system used for the determining of the lateral deflection of the element to be detected or that the movements around the rotary degrees of freedom are detected.

Moreover, there are no solutions for producing the reflection of the measuring beam of an interferometer or is distance sensor or sensor in accordance with a focusing method such as autofocusing, or of an image processing sensor on the surface of the element to be detected such as a touching form element or of the mark associated with the latter.

A coordinate measuring device with a rigid feeler is known from U.S. Pat. No. 5,825,666 that has two target marks in order to be able to make conclusions with them about the spatial position of the touching form element.

WO-A-02/106765 relates to a method for measuring objects in which the Z position of the touching form element of a tactile, optical feeler is measured with a laser distance sensor. Furthermore, an image processing sensor can be provided.

An arrangement and a method for the optical, tactile measuring the structures of an object with a coordinate measuring device can be gathered from WO-A-02/25206. A first optical sensor and a mechanical feeler with a touching form element are integrated to a unit. In order to measure the touching form element three-dimensionally a second optical sensor with the same type of construction is used whose optical axis runs vertically to that of the first optical sensor.

A generic device is known from WO-A-03/008905. The position of a touching form element or the surface properties of an object are selectively measured with the distance sensor. Alternatively, the position of the touching form element can be measured with an image processing sensor, whereby the distance sensor then serves to illuminate the touching form element.

According to U.S. Pat. No. 6,441,910 a coordinate measuring device comprises a mechanical feeler and an optical sensor in order to be able to measure an object optotactically. The mechanical feeler and the optical sensor can be adjusted as a unit.

In order to measure an object by a coordinate measuring device the position of a feeler can be adjusted according to DE-A-198 05 892 by an optical detection device that can be adjusted independently of the feeler.

According to EP-A-0 965 816 geometric structures of an object are measured with an optical detection device and a feeler that can move independently of one another.

Consequently, previously known methods and coordinate measuring devices basically relate only to a partial solution of the entire problem in order to ensure an exact spatial determination of the position of the touching form element.

According to WO-A-98/57121 a photogrammetric based on triangulation is used for a 3-dimensional determination of the position of the touching element.

A coordinate measuring device with mechanically feeling sensors can be gathered from DE-A-43 27 250. Here, a visual check of the mechanical touching process can take place with the aid of a monitor in order to avoid destroying the feeler.

U.S. Pat. No. 4,972,597 describes a coordinate measuring device with a feeler whose feeler extension is prestressed by a spring in its position.

According to WO-A-99/63301 a structure of an object is measured with a touching form element associated with a coordinate measuring device, the position of which element is detected by an optical sensor. The sensor and the feeler are constructed as a unit that can be adjusted in common. This can take place according to WO-A-02/025206 from a rotary pivoting articulation.

According to DE-U-298 08 683 the spatial position of a feeler can be determined by two optical sensors, one of which measures the Z coordinate and the other the X, Y coordinates. The same results from the DE. J.: tm-Technisches Hessen 66 (1999) 12, pp. 1-5, Schwenke et al.: "Opto-Tactile Sensor for the 2-D and 3-D Measuring of Small Structures with Coordinate Measuring Devices".

A method and a device for measuring an object with a coordinate measuring device are known from EP-B-1 528 354. In order to make possible a three-dimensional determination of the position of a touching form element while minimizing measuring errors, an optical sensory mechanism is used that comprises a distance sensor and an image processing sensor with a common optical beam path. Both sensors always detect the same mark of the touching form element itself. In particular, it is not possible to detect a mark or the touching form element with the image processing sensor if the mark measured by the distance sensor is located above the mark that is to be detected in front of the image processing sensor since in order minimize measuring errors the fastening of the fiber used is arranged close to the mark of the distance sensor in order to minimize lateral shifts during the deflection of the touching form element, as a result of which the fastening covers the mark or the touching form element detected by the image processing sensor. In addition, the problem of bringing the mark or the touching form element detected by the image processing sensor to self-illuminate remains unsolved since the mark of the laser reflector does not allow an appropriately necessary coupling in of light into the fiber and the mark or the touching form element located under the laser reflector.

The present invention has the task of avoiding the disadvantages of the prior art and to basically make possible a rapid and precise detection of the relative or absolute position of the element to be detected, such as a touching form element or a mark associated with the latter.

The task is substantially solved by a method in which the position of an touching form element and/or at least one mark associated with the latter is determined in at least one direction with an optically laterally measuring method such as 2-D image processing, and the position of the touching form element and/or at least of one mark associated with the latter is determined in at least one second direction with at least one distance sensor such as an interferometer, preferably an absolutely measuring heterodyne interferometer, and/or by a laser distance sensor or sensor according to the focus principle such as an autofocus sensor and/or image processing sensor and/or by the evaluation of mechanical-electrical sensors in the holder of the touching form element, whereby the method is preferably used in a coordinate measuring device and preferably every sensor can be positioned in the X, Y and/or Z direction relative to an object of measuring.

The present invention solves the task by using an absolutely or relatively measuring distance sensor such as an interferometer, laser distance sensor or focus sensor such as an autofocus. The precision that can be obtained by the using of interferometers is advantageously in the range of a few nanometers or below it. Also, data rates of several thousand measured values per second can be achieved with interferometers. The distance sensor used determines the position of the touching form element or of the associated mark by reflection of the measuring beam on the touching form element or the associated mark by appropriate reflection layers.

According to the invention a method is particularly suggested for the determining of structures and/or the geometry of an object such as a workpiece in a coordinate measuring device by means of a tactile, optical measuring method, whereby the position of a touching form element or at least of a mark associated with the latter is determined in at least one direction such as the X and/or Y direction of the coordinate measuring device by a first sensor with an optically laterally measuring method and the position of the touching form element or at least of the mark associated with the latter is determined in at least one second direction such as the Z direction of the coordinate measuring device with at least one distance sensor, that is distinguished in that in order to fasten the touching form element and the optionally at least one mark associated with the latter in a holder at least one flexible connecting element is used that is passed through by the beam path of the first sensor in the direction of the beam and that the at least one flexible connecting element is transparent and/or is arranged in a strongly defocused manner relative to the first sensor.

In addition, a distance sensor or interferometer or focus sensor is preferably used, especially a heterodyne interferometer that operates with several wavelengths and as a result measures in an absolute manner, as can be gathered from the prior art.

The supplying of the measuring radiation of the interferometer preferably takes place by the feeler extension, known from the prior art of the fiber feeler, in the form of an optical fiber such as, for example, an optical waveguide, whereby the optically active connection preferably takes place on a fiber end or by Y-couplers or via an optical, preferably neutral divider layer or deflection layer of a prism or thin layer arranged above the upper fiber end. The reflection takes place on or close to the element to be detected, for example, on a reflection layer, introduced on the upper fiber end, below the deflection prism or on the metal-coated bottom of the touching form element. Subsequently, the measuring radiation again passes the supply in the opposite direction in order to interfere with the reference beam path of the interferometer.

The determination of the absolute position of the element to be detected with the aid of the measuring data of the distance sensor takes place vertically parallel to the evaluation of the lateral deflection of the element to be detected, which evaluation is described in the prior art. In addition, this distance sensor is operated in accordance with the invention almost simultaneously or synchronously with the measuring system for determining the lateral deflection and preferably forwards the measured data or measured signals to a higher-order evaluation system.

The higher-order evaluation system calculates the three-dimensional position of the element to be detected from the measured data or measured signals of the distance sensor and from the measured data of the measuring system for determining the lateral deflection of the element to be detected.

The touching form element can be manually or automatically removed from the beam path of the other optical sensors by the arrangement of the feeler extension and optionally of the interferometric measuring system at a change interface. This makes it possible to also use the image processing sensor and the other optical sensors for the direct measuring of the structures and/or the geometry of an object such as a workpiece.

In addition, a corresponding arrangement for the implementation of the method in accordance with the invention contains at least one touching form element and preferably a mark associated with the latter, a detection means detecting the touching form element and/or the mark in an optically 2-dimensional manner and contains a distance sensor detecting the position in the third dimension.

The measuring radiation of the interferometric distance sensor is supplied to the element to be measured such as a touching form element or a mark associated with the latter preferably by the feeler shaft, such as an optical waveguide, connecting the element to be measured to the detection means that optically detects in a 2-dimensional manner.

The initially explained prior art, in particular the two-dimensional optical evaluation of the deflection of a touching form element or of a mark associated with the latter, the fastening of a touching form element on a flexible feeler extension and the arrangement on a rotary-/pivoting articulation as well as the separable fastening on a change interface also constitute, in conjunction with the method in accordance with the invention or with the arrangement in accordance with the invention, a component of the present invention.

The invention provides an isotropic fastening of an optically detectable touching form element. This type of fastening makes possible a directionally independent touching force during a deflection of the touching form element by almost the same stiffness in all directions.

Furthermore, in addition to the deflection even the rotation of the touching form element can be determined about each of the three spatial directions. This makes the use of arm configurations or star feeler configurations possible.

According to the invention there is the possibility that the illumination of the touching form element or of a mark associated with the latter takes place by an epi-illumination such as a dark-field- or bright-field top illumination so that the using of transillumination or the coupling of light into the fiber could be avoided.

Consequently, the invention is distinguished among other things by a method for the determining of structures and/or of the geometry of an object such as a workpiece by a tactile, optical measuring method, whereby the position of a touching form element or at least of a mark associated with the latter is determined in at least one direction by an optically laterally measuring method such as 2-D image processing, and the position of the touching form element and/or of at least one mark associated with the latter is determined in at least one second direction with at least one distance sensor such as interferometers, preferably absolutely measuring heterodyne interferometers, and/or by a laser distance sensor or a sensor in accordance with the focus principle such as an autofocus sensor and/or image processing sensor, in particular laterally measuring image processing sensors in the holder of the touching form element.

In an independent embodiment different marks, preferably at different vertical distances, are used for the lateral determination of the position of the touching form element and for the vertical determination of the position of the touching form element with the distance sensor. In particular, it is provided that different marks, preferably at different vertical distances are used for the lateral determination of the position of the touching form element or at least of the mark associated with the latter with the optically laterally measuring method and for the determination of the position of the touching form element or at least of the mark associated with the latter in the second, such as the vertical direction with the distance sensor.

It is provided in accordance with this invention that the one connecting element, preferably several flexible connecting elements, are appropriately dimensioned and arranged for generating forces that are independent in at least two directions and/or for generating almost the same mechanical stiffness upon deflection, whereby the flexible connecting elements preferably emanate from an annular holder structure and the beam paths of the optical sensors for measuring the touching form element and/or the associated mark penetrate the arrangement of the flexible connecting elements in the direction of radiation.

Furthermore, the invention is distinguished in that the arrangement of optical sensors and flexible connecting elements takes place in such a manner that the connecting elements are strongly defocused or transparent and as a result are practically ineffective for the function of the optical measuring.

The flexible connecting elements can preferably be connected to an annular holder structure.

In particular, it is provided that each sensory mechanism can be positioned in the X, Y and/or Z direction relative to the object of measurement.

The method should also be used in a coordinate measuring device.

It is provided in accordance with this invention that the position of a touching form element or at least of the mark associated with the latter is determined in two directions with an optically laterally measuring method, preferably in image processing sensor with a matrix camera such as a CCD camera or CMOS camera, and in the third direction with a distance sensor such as an absolutely or relatively measuring interferometric sensor, and/or laser distance sensor and/or focus sensor such as an autofocus sensor and/or image processing sensor, preferably laterally measuring by beam deflection.

A concept enjoying independent protection is characterized in that the position of the touching form element or at least of the mark associated with the latter is determined in at least one direction by detecting the side, facing the sensory mechanism, of the touching form element or of the associated mark or touching form element and preferably associated shaft carrying at least one mark.

It is preferably provided that a layer such as a reflection layer is fastened on the side facing the sensory mechanism, which later preferably has color-selective properties that are designed in such a manner that the wavelength of the measuring radiation of the sensor used for determining the at least one direction is reflected and in addition the radiation of a light source with deviating wavelength is preferably transmitted.

It should be especially emphasized that the illumination of the touching form element and/or of the at least one associated mark and/or of the reflection layer facing the sensory mechanism takes place by:

- a transillumination of the touching form element or of the mark from the direction opposite the sensor, whereby the reflection layer not covering the edges of the touching form element or of the mark throws a shadow into the image processing sensor that is used to evaluate the two-dimensional lateral position, and/or
- self-illumination of the touching form element or of the mark by coupling light into the touching form element or into the mark and/or the shaft, preferably laterally with the aid of a spliced light fiber attached underneath the reflection layer, whereby the reflection layer not covering the edges of the touching form element or of the mark throws a shadow into the image processing sensor that is used for evaluating the two-dimensional lateral position, and/or
- self-illumination of the touching form element or of the mark by coupling light into the touching form element or into the mark and/or the shaft, preferably laterally with the aid of a spliced light fiber attached underneath the reflection layer, whereby the distance between the luminous touching form element or first mark is great enough that the reflection layer of the second mark, which reflection layer is located above, does not cover at least the edge of the touching form element or of the first mark, and/or
- self-illumination of the touching form element or of the mark by coupling light into the touching form element or into the mark and/or the shaft, whereby the side of the coupling in, which side faces the sensory mechanism, is preferably coated with a color-selective layer and preferably with the aid of an optical, preferably neutral divider layer or deflection layer arranged above the upper shaft end, and/or
- by bright field illumination and/or dark field illumination associated with the image processing sensor, and/or
- by the measuring beam of the distance sensor or interferometer.

The invention preferably provides that a separate illumination takes place for the optically laterally measuring method and the measuring in the second direction or in the third direction in that different wavelengths are used and/or that the illumination is modulated and/or that the illumination takes place alternating in time, whereby a separation of the wavelengths takes place in the evaluation beam paths by mechanical filters such as color-selective layers and/or interference filters.

The measuring in the third direction expresses the fact that two directions lying in one plane are measured with the optically laterally measuring method. The second and the third direction are in so far the same from the measuring direction.

A concept of the invention to be emphasized is the fact that the measuring radiation of the interferometric measuring system is coupled into the optical fiber or optical waveguide, is subsequently reflected on or near the touching form element or a mark associated with the latter and subsequently runs at least partially through the optical fiber or optical waveguide in the opposite direction and subsequently interferes with the reference beam path of the interferometric measuring system.

The invention is distinguished in particular in that the measured values of the optically laterally measuring method such as an image processing system and of the at least one distance sensor are taken up almost simultaneously or synchronously and preferably the measured data and/or measured signals are forwarded to a higher-order evaluation system that calculates the three-dimensional position of the touching form element or of a mark associated with the latter from the measured data and/or measured signals.

The invention also provides that the rotation and/or tilting of the touching form element about one, two or three spatial directions is determined by measuring the positions of several associated marks, whereby the marks are detected by the optically laterally measuring method and/or by the at least one distance sensor.

In particular, the invention is also distinguished in that the rotation of the touching form element about the axis of the shaft is determined by measuring by at least one optically laterally measuring method in that the position of a directed structure applied on at least one mark is determined or the positions of at least two laterally offset marks associated with the touching form element are determined.

It should be emphasized that the bending and/or tilting of the shaft is detected by measuring at least two marks arranged on the shaft preferably in superposition with the aid of the optically laterally measuring method in two different working intervals and/or magnification stages of an associated zoom lens or by two cameras with different working intervals that selectively use a common imaging objective, whereby the lower or first mark or the touching form element is preferably illuminated by self-illumination. The upper or second mark is preferably formed by the upper shaft end or the reflection layer applied on the latter and illuminated by bright field illumination and/or dark field illumination.

This invention provides that the optically laterally measuring method and the distance sensor at least partially use the same beam path, whereby the separation of the measuring radiation associated with the two sensors takes place in that the two measuring radiations use different wavelengths and wavelength-selective dividers are used, or in that cyclically successive deflection elements such as deflection mirrors alternately couple in the measuring radiations of the two sensors or in that an optical element that cyclically changes the working distance such as a flexible lens, e.g., liquid lens, e.g., oscillating with 50 to 100 Hertz is used in order to align in a cyclically alternating manner and successively the measuring radiations of the two sensors onto the different working intervals.

The invention provides that the laterally measuring sensor and the distance sensor at least partially use a common beam path, whereby the separation of the beam courses of both sensors takes place by wavelength-selective elements or by cyclically introduced switching elements such as deflection mirrors or by flexible lenses such as liquid lenses, preferably oscillating with 50 to 100 Hertz, which lenses cyclically influence the working distance.

A separation of the beam courses is necessary since under certain instances different marks are detected by the two sensors (usually at a different working distance) and a separate evaluation of the returning radiation must take place. In order to make this possible in the at least partially same beam path (lens construction), the separation of the beam courses can be carried out by:

1. wavelength-selective elements (e.g., divider layers or divider cubes). Light is reflected or let through as a function of the wavelength; or
2. by deflection mirrors that can be alternately folded in and out and which switch in time between the two beam paths. The evaluation of the sensor must be appropriately synchronized with this; or
3. by cyclically switching the working distance with a flexible lens. Here too, the evaluation of the sensors must be appropriately synchronized.

It is preferably provided that the movement or deflection of the touching form element is determined in the given six degrees of freedom by linking the measured results from two different marks or a touching form element with two laterally measuring sensors such as image processing sensors and a distance sensor and/or neglecting the degree of rotational freedom about the shaft axis in five degrees of freedom.

The determination of the three degrees of rotational freedom can take place by:
1. Tilting about the horizontal; i.e., a lateral sensor with two working distances or two lateral sensors with a different working distance detect two superposed marks (FIG. 11c) or two distance sensors detect two adjacent marks (FIG. 11a).
2. by rotation around the shaft axis; i.e., a lateral sensor measures two marks attached next to one another (FIG. 11a) or a structural position on a mark is measured.

The determination of only two degrees or rotational freedom, i.e., limitation to a total of 5 degrees of freedom, takes place by measuring two superposed marks without a mark laterally attached next to them or a structure on the upper mark. These measures yield a simpler construction.

The invention provides in its design that the structures and/or geometry of an object such as a workpiece can be directly measured with optically laterally measuring methods and/or a distance sensor by manually or automatically removing the touching form element and the optionally associated mark and preferably the interferometric measuring system out of the beam path of the optically laterally measuring method.

The invention is also distinguished in that in addition to or alternatively to the detection with at least one of the sensors in the form of the optically laterally measuring sensor and of the distance sensor at least one direction of the position of the touching form element and/or of a mark associated with the latter takes place by means of at least one mechanical and electrical sensor integrated in the at least one connecting element of the holder of the touching form element, the electrical signals of which sensor are evaluated that change as a function of the deformation such as the bending and/or stretching and/or compression and/or torsion of the at least one flexible connecting element in a value such as amplitude, phase or frequency.

Mechanical electrical sensors are sufficiently known from the prior art such as wire strain gauges, whose resistance changes upon expansion. A signal evaluation usually takes place with the bridge circuit of two or four or more resistors. A bridge signal such as amplitude is measured. In other evaluation methods a deflection of the measuring signal is compensated and the compensation signal measured or a corresponding phase jump or frequency jump is detected.

It is preferably provided that the mechanical electrical sensor comprises at least two measuring elements such as wire strain gauges and/or piezoresistive sensors and/or inductive sensors and/or capacitive sensors, whereby several of their signals are preferably combined by computer.

The invention also provides that the optically laterally measuring sensor is used for the determining of the position of the touching form element and/or of a mark associated with the latter in two directions and that the mechanical electrical sensor is used for determining in the third direction and/or for determining the tilting of the touching form element and/or of a mark associated with the latter about one, two or three directions.

The teaching is to be emphasized that the sensory mechanism comprising the sensors used is moved for determining the position of the touching form element and/or of the associated mark during the measuring relative to the object to be measured, whereby a synchronization takes place, preferably with the aid of a control unit that is connected via a trigger line to the sensory mechanism and to the traveling axes of the coordinate measuring device for moving the sensory mechanism relative to the object and at least relative to an illumination device or to a shutter associated with an image processing sensor as one of the sensors of the sensory mechanism, between:

- the measured value receiver of a first sensor of the sensory mechanism for the lateral measuring, preferably the image recording of the image processing sensor, and
- the measured value receiver of at least a second sensor of the sensory mechanism for the distance measuring, preferably the image recording of a second camera of the first or of a second image processing sensor or of the measured value receiver of the laser distance sensor or focus sensor or interferometric sensor, and
- the determination of the position of the traveling axes for the movement of the sensory mechanism relative to the object, and
- the release of a lightning like illumination by the illumination device or of the shutter associated with the image processing sensor.

In particular, the invention is distinguished in that the sensory mechanism used for the determining of the position of a touching form element and/or of a mark associated with the latter is moved during the measuring relative to the object to be measured and a measuring takes place, preferably with the image processing sensor, when the position to be measured has been roughly reached.

It is also provided that the sensory mechanism used for the determining of the position of a touching form element and/or of a mark associated with the latter is moved during the measuring relative to the object to be measured and that the object is measured in a scanning manner with the touching form element, that is, the workpiece is almost continuously touched.

It is preferable that at least the touching form element oscillates.

It is provided in particular that the initial measuring of the sensor and the measuring with the sensor for determining the three-dimensional position of the touching form element or of the associated mark takes place by extrapolation to a touching force=0 newtons in that the deflection determined by the sensor is preferably determined for at least one deflection direction of the touching form element for at least two deflection amounts that deviate from one another and a characteristic curve is determined from the above that describes the connection between the deflection and the touching force or between a magnitude proportional to the touching force.

It is provided in the design of the invention that the method in accordance with the invention for the determining of the roughness of the object is used, whereby the touching form element preferably has a shape like a needle, running out in a point, and the roughness determined with the distance sensor is corrected using the measured values of the laterally measuring method or associated in its lateral position. In contrast to the prior art this is detected directly or almost directly with the optically laterally measuring sensor by the fastening in accordance with the invention of the touching form element via optically non-operative fastening elements.

An arrangement for the determining of structures and/or geometry of an object such as a workpiece in a coordinate measuring device with a tactile, optical measuring method, whereby a distance sensor determining the position of a touching form element or at least of a mark associated with the latter in at least one direction such as the X direction and/or Y direction of the coordinate measuring device by a optically laterally measuring method detecting a first sensor, and at least one distance sensor detecting the position of a touching form element or at least of the mark associated with the latter in at least one second direction such as the Z direction of the coordinate measuring device are coupled, is distinguished in that the touching form element and the optionally at least one mark associated with the latter is fastened via at least one flexible connecting element, that the connecting element can be penetrated by the beam path of a first sensor used for carrying out the optically laterally measuring method in the direction of the beam, and that the at least one connecting element is transparent and/or is arranged in a strongly defocused manner relative to the first sensor, and is distinguished in that an optically laterally measuring method such as a 2-D image processing that detects the position of a touching form element and/or of at least one mark associated with the latter, and at least one distance sensor such as an interferometer, a preferably absolutely measuring heterodyne interferometer, and/or laser distance sensor and/or sensor in accordance with the focus principle such as an autofocus sensor and/or an image processing sensor, which distance sensor detects the position of the touching form element and/or of a mark associated with the latter in at least a second direction, are coupled to one another in particular by beam deflection of laterally measuring image processing sensors, and/or in the holder of the touching form element of integrated mechanical electrical sensors.

It is preferably provided that in order to produce independent forces in at least two directions and/or to produce almost the same mechanical stiffness during the deflection, at least two appropriately dimensioned, flexible connecting elements are arranged, whereby the flexible connecting elements preferably emanate from an annular holder structure and the beam paths of the optical sensors for measuring the touching form element and/or the associated market penetrate the arrangement of the flexible connecting elements is in the direction of radiation.

The optical sensors and the flexible connecting elements are arranged in such a manner here that the flexible connecting elements are strongly defocused or transparent and as a result are practically ineffective for the function of optical measuring.

In particular, it is provided that each sensory mechanism can be positioned in the X, Y and/or Z direction relative to an object of measurement.

Furthermore, the touching form element and/or at least one mark associated with the latter should emanate from a shaft that is preferably formed by a feeler extension such as an optical fiber or optical waveguide that is flexible in at least one degree of freedom.

It can also be provided that a mark for an optical 2-D sensor and a mark for the sensor for the third direction are different from or identical to one another. In particular, it is suggested that the same mark or different marks can be detected by the optical 2-D image processing sensor and by the sensor measuring the third direction in the form of the distance sensor or of a mechanical electrical sensor.

It is provided in the design that the shaft has an optically active connection, preferably on one end of the shaft and/or that can be preferably adjusted by a Y coupler or on one end of the shaft by arranging an optically, preferably neutral divider layer or deflection layer such as a prism above the shaft end for the interferometric measuring system or a light source.

Furthermore, there is the possibility that a reflection layer is provided on the touching form element or near the touching form element or near a mark associated with the latter or on the shaft end facing the sensory mechanism, preferably by coating with a reflecting layer and/or introducing a material limit by variation of the material of the feeler extension.

Independently of this, the touching form element or an associated mark of the shaft can carry a reflection layer that is preferably attached on the side facing the sensory mechanism and is preferably round and/or in the shape of an annular ring and preferably does not cover the edges of the touching form element and/or of the mark and preferably has color-selective properties.

Furthermore, there is the possibility that the touching form element or an associated mark is nearly spherical or tear-shaped and is preferably at least partially flattened on the side facing the sensory mechanism.

The invention also provides that the touching form element and an optionally associated mark and the shaft is fastened in such a manner that it can deflect in at least one direction on at least one connecting element that is flexible in at least one degree of freedom, preferably by adhesion and/or splicing, and that the connecting elements preferably contain integrated or attached mechanical electrical sensors.

Furthermore, it should be emphasized that flexible connecting elements have a rectangular, preferably narrow and flat or round cross-section, preferably with a small diameter and preferably do not completely cover at least the edges of the touching form element and/or of the at least one associated mark for the beam paths of the image processing sensor and/or of the distance sensor and/or of the focus sensor.

The invention is also distinguished in that flexible connecting elements for the production of forces that are independent in at least two directions and/or are dimensioned and arranged with almost the same mechanical stiffness upon deflection, whereby the flexible connecting elements preferably emanate from an annular holder structure.

It is also inventive that three or more flexible connecting elements are arranged circularly, preferably at the same angular steps about the shaft axis or at least one connecting element emanates laterally, preferably at an angle of 90° to 45° to the shaft axis facing in the direction of the sensory mechanism, from the shaft axis or from the touching form element or from an associated mark.

Another embodiment provides that flexible connecting elements are arranged in a plane above the touching form element or above a first mark and that at least one other mark is arranged above the flexible connecting elements that contains a reflection layer and/or that flexible connecting elements are arranged in a plane between a mark and the touching form element and that the mark contains a reflection layer.

It is preferably provided that several marks associated with the touching form element are arranged laterally adjacent to or in the direction of the shaft above the touching form element that can be detected successively or simultaneously by the image processing sensor and/or the distance sensor and/or the focus sensor and/or the interferometric sensor, whereby the image processing sensor is connected to a lens with changeable working distance and/or changeable magnification and/or with two cameras with different working distances that selectively use a common imaging lens.

The invention is also distinguished in that the touching form element and preferably a mark associated with the latter are preferably fastened together with the interferometric measuring system in a separable manner on a change interface and/or a rotary articulation or a rotary pivot articulation and can therefore be manually or automatically removed out of the beam path of the optically laterally measuring sensor.

This invention suggests that a touching form element connected to a shaft and preferably at least one mark associated with this touching form element and at least one connecting element that emanates from the shaft or from the touching form element or the mark and that is flexible in at least one degree of freedom is arranged in front of a sensory mechanism, which sensory mechanism consists of
- a preferably neutral divider layer, and
- a first branch connected to it and comprising or consisting of an illumination of the first wavelength and preferably of an imaging pattern, and
- a second branch connected to it and comprising or consisting of
  - an imaging beam path of a first wavelength such as an image processing beam path with a first working distance and a first camera, which imaging beam path is separated by a color-selective layer, and
  - an imaging beam path and/or illumination beam path of a second wavelength, which imaging beam path is separated by a color-selective layer and is preferably designed as a first or second image processing sensor with a second working distance and preferably a second camera or laser distance sensor or interferometric sensor or focus sensor.

Another aspect of the invention is the fact that the following components are connected to each other and can preferably be exchanged via a manual automatic change interface in front of the sensory mechanism used:
- a shaft-connected touching form element and preferably at least one mark associated with the latter,
- at least one connecting element emanating from the shaft or the touching form element or the mark and flexible in at least one degree of freedom, and preferably
- an optical, preferably neutral divider layer or deflection layer arranged above the touching form element or the associated mark or the shaft, and preferably
- a preferably color-selective layer arranged on the touching form element or on an associated mark or on the shaft end facing the sensory mechanism, and preferably
- at least one lens as a front lens attachment.

It is provided that the touching form element is connected directly or indirectly to a mechanical oscillating element such as a piezo-oscillator.

The sensory mechanism comprises the sensor for the optically laterally measuring method and comprises the distance sensor.

In particular, the arrangement is integrated in a coordinate measuring device.

Further details, advantages and features of the invention result not only from the claims, the features to be gathered from them either individually and/or in combination but also from the following description of the preferred exemplary embodiments to be gathered from the drawings, in which:

FIG. 1 shows a first embodiment of an arrangement of a tactile, optical measuring system, FIG. 2 shows a second embodiment of an arrangement of a tactile, optical measuring system, FIG. 3 shows another embodiment of an arrangement of a tactile, optical measuring system with flexible connecting elements, FIG. 3a shows another embodiment of an arrangement of the tactile, optical measuring system with flexible connecting elements and a spherical mark, FIG. 4 shows another embodiment of an arrangement of a tactile, optical measuring system with change interface and piezo-oscillator, FIG. 5 shows another embodiment of an arrangement of the tactile, optical measuring system with two working distances of an image processing sensor and a dark field illumination, FIG. 6 shows various embodiments of an arrangement of touching form element, mark and flexible connecting elements, FIG. 7 shows another embodiment of a fastening and for coupling light into a mark associated with a touching form element, FIG. 8 shows a first embodiment of flexible connecting elements and a holding structure, FIG. 9 shows a second embodiment of flexible connecting elements and a holding structure, FIG. 10 shows a third embodiment of flexible connecting elements and a holding structure, FIG. 11a-c shows different embodiments of an arrangement of several marks to be detected, and FIG. 12 shows a basic view of a coordinate measuring device.

In the following description of several embodiments in accordance with the invention basically the same reference numerals are used for the same elements so that in the following association between the elements and the reference numerals takes place:

1—tactile optical measuring system
2—feeler extension
3—touching form element
4—image processing sensor
5—interferometric measuring system 6—holder of the feeler extension
7—coupling
8—change interface
9—measuring beam of the interferometric measuring system 5
10—optical waveguide
11—reflecting layer
12—reference radiation of the interferometric measuring system 5
13—mark
13a—mark
13b—mark
14—reflection layer
15—distance sensor
15a—distance sensor
16—illumination
17—neutral deflection- and divider layer
18—shaft
18a—arrow symbolizing the direction of the axis of the shaft 18
19—flexible connecting elements
19a—flexible connecting element
20—holding structure
21—color-selective layer
21a—connection position of prism 33 to shaft 18 or mark 13 or touching form element 3
22—measuring beam of the distance sensor 15
23—piezo-oscillator
24—change interface
25—sensory mechanism and illumination unit
26—touching unit
27—working distance of a second radiation or of a second beam path
28—working distance of a first radiation or of a first beam path
29—dark field illumination
30—top of the shaft 18
31—light sources for dark field illumination
32—flattened top of mark 13 or of touching form element 3
33—prism
34—mechanical electrical sensor elements FIG. 1 shows a tactile, optical measuring system 1 in accordance with the invention comprising a feeler extension 2 such as an optical fiber or optical waveguide, a touching form element 3 fastened to the latter, an image processing sensor 4 and an interferometric measuring system 5. A holder 6 of the feeler extension 2 is connected via a coupling 7 to the interferometric measuring system 5 and detachably connected in an indirect manner via the change interface 8 to the image processing sensor 4. The image processing sensor 4 detects the position of the touching form element 3 optically in two directions, namely, in the exemplary embodiment in the plane that vertically intersects the plane of the drawing and runs horizontally. A measuring beam 9 of the interferometric measuring system is coupled to an end of the optical waveguide 10, that forms the feeler extension 2, and is reflected on the touching form element 3. The touching form element 3 is provided to this end on the bottom 11 with a reflecting layer. After the reflection the measuring beam runs in the opposite direction back through the optical waveguide 10 into the interferometric measuring system 5 and interferes with a reference radiation 12 of the interferometer 5. The absolute position in the measuring direction of the interferometer, that is, the vertical in the drawing, is determined by the design of the interferometric measuring system 5 as a heterodyne interferometer. As a result, the deflection of the touching form element 3 upon touching an object of measurement such as a workpiece is determined.

FIG. 2 shows the tactile, optical measuring system 1 in accordance with the invention in a basic fashion, that additionally has a mark 13 associated with the touching form element 3. Instead of the position of the touching form element 3, the position of the mark 13 is now determined with at least one of the two measuring systems 4 and 5. The determination of the position of the mark with the interferometric measuring system 5 takes place by reflection of the measuring radiation 9 on a reflection layer 14 that is introduced in the optical waveguide 10 in the vicinity of the mark. The reflection layer 14 is produced by a separately introduced, reflecting layer or by the transition to another material.

FIG. 3 shows another embodiment of the tactile optical measuring system 1 comprising the image processing sensor 4, consisting at least of an imaging lens and camera such as a CCD or CMOS camera, with integrated distance sensor 15 or an interferometric measuring system 5, illumination 16, neutral deflection- and divider layer 17, shaft 18, color-selective layer 21, touching form element 3, mark 13, flexible connecting elements 19 and holding structure 20. The axis of the shaft 18 runs in the drawing plane along the arrow 18a and corresponds approximately to the main axis of the optical sensory mechanism, that is, image processing sensor 4, interferometric measuring system 5 and distance sensor 15. The distance sensor 15 has a partially common beam path with the image processing sensor 4. The touching form element 3 and the mark 13 are connected here to the shaft 18, that is fastened by adhering or splicing on the flexible connecting elements 19 emanating from the holding structure 20.

Furthermore, the color-selective layer 21 is present on the upper end of the shaft 18 and allows a light component coming from the light source 16, which component was reflected on the neutral deflection- and divider layer 17, to be transmitted and that reflects a component of the radiation of the measuring beam 22 of the distance sensor 15 that transmits the divider 17.

The color-selective layer 21 is distinguished by a wavelength-selective reflection- and transmission behavior. Thus, for example, a radiation with wavelengths above about 550 nm to 600 nm is reflected and radiation with wavelengths below about 500 nm to 600 nm is allowed to pass through. The light of light source 16 coupled into the shaft 18 is reflected on a reflecting layer 11 on the bottom of mark 13 and is detected by the image processing sensor 4. The flexible connecting elements 19 are so narrow and/or constructed with recesses to this end that sufficient light reaches the image processing sensor 4, as is also shown in FIGS. 8 and 9. Upon contact of the touching form element 3 with the object of measurement the image processing sensor 4 then detects the deflection of the mark 13 in the two directions lying almost at a right angle to the axis 18a of the shaft 18 and the distance sensor 15 detects the deflection of the color-selective layer 21 in the direction of the axis 18a of the shaft 18, which corresponds approximately to the deflection of the touching form element 3 in the direction of the shaft 18. In order to separate the beam paths of the image processing sensor 4 and of the distance sensor 15 after the reflection on the layers 11 and 21 for evaluation, another color-selective layer is used that is located inside the common beam path of image processing sensor 4 and distance sensor 15 and is not shown in the figure. A FIG. 3a shows the tactile optical measuring system 1 in an embodiment in which the distance sensor 15 is formed by a part of the measuring radiation of the image processing sensor 4 or by another image processing sensor. The position of the mark 13, constructed spherically for the measuring with image processing, is determined in the direction of the shaft 13 and optionally vertically to it by beam deflection on the mirror 17. In addition, even another beam path can be used by another image processing sensor by further splitting off image processing sensor 4 by another deflection mirror with which even the lacking position information of the mark 13 is determined which runs in the FIG. 3a along the horizontal of the drawing plane. The deflection takes place vertically to the direction of the shaft 18 and vertically to the direction of the radiation running after the deflection mirror 17 and strikes the mark 13, that is, vertically to the drawing plane of FIG. 3a.

FIG. 4 shows another embodiment of an arrangement of the tactile, optical measuring system 1 in which the touching form element and the color-selective layer 21 are present on the shaft 18. In order to put at least the touching form element 3 in mechanical oscillations a piezo-oscillator 23 is present, for example, on the holding structure 20. However, it can also be fastened at another position such as, for example, in the vicinity of the change interface 24.

The change interface 24 makes it possible to design the touching unit 26, consisting, for example, of shaft 18 with color-selective layer 21 and touching form element 3 fastened on flexible connecting element 19 and of holding structure 20 and piezo-oscillator 23 and any front lens to be used (not shown), which lens can be arranged, for example, directly above the color-selective layer 21 in a detachable manner from the sensory mechanism and illumination unit 25, consisting, for example, of illumination 16, neutral deflection layer and divider layer 17 and image processing sensor 4 with integrated distance sensor 15.

FIG. 5 shows another embodiment of an arrangement of the tactile, optical measuring system in which an image processing is carried out in two different working distances 27, 28 of the radiation. The first beam path detects in the working interval 28 the positional change of the mark 13 at a right angle to the axis 18a of the shaft 18. The second beam path detects in the working interval 27 the positional change of a second mark at a right angle to the axis 18a of the shaft 18 that is formed by the color-selective layer 21 or the top 30 of the shaft 18 or of its edges. The illumination of this second mark such as layer 21 takes place by a dark field illumination 29 that emanates from several light sources 31, or from a bright field illumination integrated in the beam path of the image processing sensor 4 as produced by the illumination 16 and the neutral deflection layer and divider layer 17 or by the dark- and the bright field illuminations.

The image processing sensor 4 contains a lens with a changeable working distance or two cameras that are focused on the two working distances 27, 28 for evaluating the two beam paths for the working distances 27 and 28, whereby an at least partially common image lens is preferably used. The tilting of the shaft 18 about the two axes running vertically to the axis 18a of the shaft 18 is determined from the determination of the two position changes of the marks 13 and 30 and/or 21.

Alternatively, the different working distances of the image processing sensory mechanism can be used to on the one hand to detect the position change of the mark 13 and on the other hand to merely observe the top 30 of the shaft 18 in order, for example, to carry out the alignment of the distance sensor with the top 30 of the shaft 18.

FIG. 6 shows different embodiments of the arrangement of touching form element 3, mark 13 and flexible connecting elements 19 by which the shaft 18 is connected to the holder or holder structure 20. The connecting elements 19 are accordingly always located above the touching form element 3 as is shown, for example, in FIG. 6 a), selectively also above or below the mark 13, as shown in the FIGS. 6 b) and 6 c).

The distance of the flexible connecting elements 19 to the top 30 of the shaft 18 is preferably selected to be very small, e.g., 5 mm or 2 mm or 1 mm or especially preferably 0 mm in order to keep as small is possible the lateral deflection of the layer 21 serving as reflection layer for the distance sensor during the deflection of the touching form element 3.

FIG. 6 d) shows an alternative arrangement of the color-selective layer 21 on the flattened surface 32 of the mark 31. An arrangement of the color-selective layer 21 on the flattened surface of the touching form element 3 is alternatively possible.

An alternative arrangement of a neutral deflection- and divider layer on a prism 33 can be gathered from FIGS. 6 e) and f), which prism is connected to the shaft 18 or to the mark 13. The color-selective layer 21 is located on the appropriate connecting position 21a and is supplied on the upper end of the shaft 18 or the bottom of the prism 33.

FIG. 7 shows an alternative fastening of the shaft 18. A flexible connecting element 19a is fastened to this end laterally on the mark 13, e.g., adhered or spliced on or forms a unit with the mark 13. Alternatively, the flexible connecting element 19a can also be fastened on the shaft 18 or the touching form element 3 in the same manner. The touching form element 3 or, as shown in the figure, the mark 13 has a flattened top 32 for the color-selective layer 21. Alternatively, a light source 16 is fastened on the flexible connecting element 19a that couples light into the mark 13 or into the touching form element 3 or into the shaft 18, as a result of which the position of the mark 13 or of the touching form element 3 can be evaluated with the image processing sensor. In this instance the layer 21 can also be designed to be non-color-selective, thus, it reflects all light.

FIG. 8 shows a preferred embodiment of the flexible connecting elements 19 and of a holder structure 20 in a top view, that is, in the direction of the axis of the shaft 18. The measuring with the image processing sensor 4 can optically penetrate through the plane of the flexible connecting elements 19 and take place almost uninfluenced by the flexible connecting elements 19 by virtue of the narrow construction of the flexible connecting elements 19 and their arrangement outside of the focus plane of the image processing sensor 4. The arrangement and dimensioning of the flexible connecting elements 19 additionally makes possible an almost equal mechanical stiffness in the deflection of the touching form element 3 in at least two or also three axes. Moreover, preferably six mechanical, electrical sensor elements 34 such as, for example, wire strain gauges or piezo-resistive sensor elements are additionally selectively applied on the flexible connecting elements 19 or integrated into them in order to make possible a determination of the movement of the touching form element in one or more degrees of freedom in addition to the measuring with the image processing sensor 4.

FIG. 9 shows a second embodiment of the flexible connecting elements 19 and of the holder structure 20. Mechanical, electrical sensor elements 34 can also be selectively applied on the flexible connecting elements 19 or integrated into them.

Another embodiment of the flexible connecting elements 19 and of holder structure 20 can be recognized from FIG. 10, in which the flexible connecting elements 19 are arranged superposed in two planes and connected to the shaft 18. The corresponding parallel spring guidance ensures that upon the deflection of the touching form element 3 in the direction of the axis 18a of the shaft 18 almost no shifting of the touching form element 3 and of the shaft 18 takes place in the directions transversally to the axis 18a of the shaft 18. Also, all rotary degrees of freedom can be blocked by the appropriate dimensioning of the flexible connecting elements 19. The arrangement of the flexible connecting elements 19 takes place completely above the optionally present mark 13, as FIG. 10 a) illustrates, or partially between the mark 13 and the touching form element 3, as FIG. 10 b) shows. Alternatively, an arrangement of the flexible connecting elements 19 completely below the mark 13 is also possible.

FIG. 11 shows embodiments of the arrangement of several marks 13a to be detected. These marks are detected at the same time by the first beam path 28 of the image processing sensor 4 with a large field of vision, as can be recognized in FIGS. 11 a), b) and c). As a result, in addition to the lateral shift transversely to the axis of the shaft 18 the rotation of the touching form element 3 about the axis 18a of the shaft 18 can be determined. Additionally, a distance sensor 15 can be used, as shown in FIG. 11 a), that determines the deflection of the mark 13 in the direction of the axis 18a of the shaft 18. Also, the deflection transversely to the axis 18a of the shaft can be determined by focusing of the mark 13b with a working distance deviating from the second beam path 27 by the image processing sensor 4 (see FIG. 11 C).

The determination of the deflection of the marks 13a can (see FIG. 11 a) also take place with one or more other distance sensors 15a integrated in the image processing sensor 4, for example, with an autofocus sensor that uses the same beam path as the image processing sensor 4 and preferably the measured values of at least one or more parts of the sensor area of the camera of the image processing sensor 4. As a result thereof, the tiltings of the shaft 18 and of the touching form element 3 about the axes lying at a right angle to the axis 18a of the shaft 18 are determined. As FIG. 11 a) shows, the touching form element 3 is arranged on the side in order to make possible measurings of undercuts or horizontally lying geometries. Alternatively, appropriate lateral prolongations can be attached on all marks 13a.

FIG. 12 shows a purely basic embodiment of a multi-sensor coordinate measuring device 130. The sealings can be selectively mounted or dismounted or automatically replaced via corresponding sensor replacement systems even during the operation. Of course, the invention is not departed from if an appropriate number of selected sensors is left firmly mounted on the device in order to measure objects in this configuration.

Independently of the above, the sensory mechanism comprises at least one sensor, also designated as the first sensor, for carrying out an optically lateral measuring method, that is, in particular a 2-D image processing sensor. This should detect the lateral deflection of a touching form element or of a mark associated with the latter during the measuring of a workpiece 116, as was previously described. Furthermore, the sensory mechanism comprises a distance sensor, in particular in the form of an absolutely measuring heterodyne interferometer in order to measure the touching form element or the mark associated with the latter in the Z direction of the coordinate measuring device, i.e., the position of the touching form element or of the mark.

The principle of a coordinate measuring device 130, that is sufficiently known and reproduced once again in FIG. 12, comprises a base frame 112 consisting, e.g., of granite, with the measuring table 114 on which the object of measurement (workpiece 116) is positioned in order to measure its surface properties.

A gantry 119 can be adjusted along the base frame 112 in the Y direction. To this end columns or posts 120, 122 are slidingly supported on the base frame 112. A traverse 124 runs from the columns 120, 122 along which traverse a carriage can move that for its part receives a spindle sleeve or column 126 that can be adjusted in the Z direction. A tactile sensor 30 starts from the spindle sleeve 126 or optionally from a change interface 128 connected to the spindle sleeve 126 in order to tactilely and optically measure with inclusion of the image processing sensor 130. However, to this extent sufficiently known techniques are referred to. Furthermore, the distance sensor is located in the spindle sleeve 126.

The basic view of FIG. 12 does not show the holder, comprising the flexible connecting elements, for the tactile sensor 130, that can be connected via the holder to the change interface 128.

The invention claimed is:

1. A method for the determining of structures and/or geometry of an object in a coordinate measuring device by a tactile, optical measuring method, whereby the position of a touching form element or at least of a mark associated with the latter is determined in at least one direction of the coordinate measuring device by a first sensor with an optically laterally measuring method using a 2-D image processor, and the position of the touching form element or at least of the mark associated with the latter is determined in at least one second direction of the coordinate measuring device with at least one distance sensor, characterized in that the touching form element and the optionally at least one mark associated with the latter emanate from a shaft, and in order to fasten the shaft in a holder, at least one flexible connecting element is used that is passed through by the beam path of the first sensor in the direction of the beam and that the at least one flexible connecting element is transparent and/or is arranged in a strongly defocused manner relative to the first sensor;

the position of the touching form element or at least of the mark associated with the latter is determined in at least one direction by detecting the side of the touching form element, or the associated mark, which side faces a sensory mechanism used for the measuring.

2. A method for the determining of structures and/or geometry of an object in a coordinate measuring device by a tactile, optical measuring method, whereby the position of a touching form element or at least of a mark associated with the latter is determined in at least one direction of the coordinate measuring device by a first sensor with an optically laterally measuring method using a 2-D image processor, and the position of the touching form element or at least of the mark associated with the latter is determined in at least one second direction of the coordinate measuring device with at least one distance sensor, characterized in that the touching form element and the optionally at least one mark associated with the latter emanate from a shaft, and in order to fasten the shaft in a holder, at least one flexible connecting element is used that is passed through by the beam path of the first sensor in the direction of the beam and that the at least one flexible connecting element is transparent and/or is arranged in a strongly defocused manner relative to the first sensor; and different marks are used for the lateral determination of the position of the touching form element or at least of the mark associated with the latter with the optically laterally measuring method and for the determination of the position of the touching form element or at least of the mark associated with the latter in the second direction with the distance sensor.

3. The method according to claims 1 or 2, characterized in that
a sensor from the group of interferometer, laser distance sensor, sensor according to the focus principle, autofocus sensor, image processing sensor is used as distance sensor.

4. The method according to claims 1 or 2, characterized in that
the flexible connecting elements are connected by an annular holder structure.

5. The method according to claims 1 or 2, characterized in that
the position of the touching form element or at least of the mark associated with the latter is determined in at least one direction by detecting the shaft carrying the touching form element and the optionally present mark.

6. The method according to claim 1 or 2, characterized in that
a layer is provided on the side of the touching form element, or on the associated mark, facing a sensory mechanism that makes possible at least the optically laterally measuring method.

7. The method according to claim 6, characterized in that the layer is a reflection layer.

8. The method according to claim 7, characterized in that the reflection layer has color-selective properties that are designed in such a manner that measuring radiation of a wavelength of the sensor used for determining the at least one direction is reflected and additional radiation of a light source with deviating wavelength is transmitted.

9. The method according to claims 1 or 2, characterized in that
the touching form element and/or the at least one associated mark and/or a reflection layer facing the sensory mechanism is/are illuminated by a trans-illumination or by self-illumination or by bright field illumination and/or dark field illumination associated with the image processing sensor or by the measuring radiation of the distance sensor or of the interferometer.

10. The method according to claims 1 or 2, characterized in that
during the illumination by self-illumination of the touching form element or of the mark associated with the latter by coupling light into the touching form element or into the mark or the shaft the side of the coupling in facing the sensory mechanism is coated with a color-selective layer.

11. The method according to claims 1 or 2, characterized in that
during the illumination by self-illumination of the touching form element or of the mark associated with the latter by coupling light into the touching form element or into the mark or the shaft an optically neutral divider layer or deflection layer is arranged above or on the upper shaft end.

12. The method according to claims 1 or 2, characterized in that
when using different wavelengths in evaluation beam paths used for the measuring, a separation of the wavelengths takes place by mechanical filters.

13. An arrangement for the determining of structures and/or geometry of an object in a coordinate measuring device with a tactile, optical measuring method, whereby a first sensor determining the position of a touching form element or at least of a mark associated with the latter in at least one direction of the coordinate measuring device by an optically laterally measuring method, and at least one distance sensor that detects the position of a touching form element or at least of the mark associated with the latter in at least one second direction of the coordinate measuring device are coupled, characterized in that
the touching form element and the optionally at least one mark associated with the latter emanate from a shaft, wherein said shaft is fastened via at least one flexible connecting element, that the connecting element can be penetrated by the beam path of the first sensor used for carrying out the optically laterally measuring method in the direction of the beam, and that the at least one connecting element is transparent and/or is arranged in a strongly defocused manner relative to the first sensor.

14. The arrangement according to claim 13, characterized in that
the first sensor used for the optically laterally measuring method is a 2-D image processing sensor.

15. The arrangement according to claim 13, characterized in that
the distance sensor is a sensor selected from the group consisting of interferometer, laser distance sensor, sensor according to the focus principle, autofocus sensor, and image processing sensor.

16. The arrangement according to claim 13, characterized in that
at least two flexible connecting elements emanate from an annular holder structure.

17. The arrangement according to claim 13, characterized in that
different marks, at different vertical distances, can be used for the lateral determination of the position of the touching form element or at least of the mark associated with the latter with the sensor that carries out the optically laterally measuring method and for the vertical determination of the position of the touching form element or at least of the mark associated with the latter with the distance sensor.

18. The arrangement according to claim 13, characterized in that
the touching form element and/or at least the mark associated with the latter emanate from the shaft that is a feeler extension that is flexible in at least one degree of freedom.

19. The arrangement according to claim 13, characterized in that
a reflection layer is provided on the touching form element or near the touching form element or a mark associated with the latter or on a shaft end facing the sensors.

20. The arrangement according to claim 19, characterized in that
the reflection layer is formed by coating with a reflecting layer and/or introducing a material limit by variation of the material of the feeler extension.

21. The arrangement according to claim 19, characterized in that
the reflection layer is round and/or in the shape of an annular ring.

22. The arrangement according to claim 19, characterized in that
the reflection layer has color-selective properties.

23. The arrangement according to claim 13, characterized in that
at least three flexible connecting elements are arranged circularly, at the same angular steps about the axis of the shaft or at least one connecting element emanates laterally, at an angle of 90° to 45° to the shaft axis facing in the direction of one of the sensors, from the shaft axis or from the touching form element or from an associated mark.

24. The arrangement according to claim 13, characterized in that
flexible connecting elements are arranged in a plane above the touching form element or above a first mark and that at least one other mark is arranged above the flexible connecting elements that contains a reflection layer.

25. The arrangement according to claim 13, characterized in that
flexible connecting elements are arranged in a plane between a mark and the touching form element and that the mark contains a reflection layer.

26. The arrangement according to claim 13, characterized in that
the following components are connected to each other:
a touching form element connected to a shaft and at least one mark associated with this touching form element, and
at least one connecting element emanating from the shaft or the touching form element or the mark and flexible in at least one degree of freedom.

27. The arrangement according to claim 26, characterized in that
an optical, neutral divider layer or deflection layer arranged above the touching form element or the optionally associated mark or the shaft is connected to the components.

28. The arrangement according to claim 26, characterized in that
a color-selective layer arranged on the touching form element or on a mark associated with the latter or on the shaft end facing one of the sensors is connected to the components.

29. The arrangement according to claim 26, characterized in that
at least one lens is connected to the components.

30. The arrangement according to claim 13, characterized in that
a touching form element connected to a shaft and at least one mark associated with this touching form element, and at least one connecting element emanating from the shaft or the touching form element or the mark and flexible in at least one degree of freedom are arranged in front of a sensory mechanism.

31. The arrangement according to claim 30, characterized in that
the sensory mechanism consists of a neutral divider layer and
a first branch connected to it and consisting of an illumination of the first wavelength and of an imaging pattern, and
a second branch connected to it and consisting of
an imaging beam path of a first wavelength with a first working distance and a first camera, which imaging beam path is separated by a color-selective layer, and
an imaging beam path of a second wavelength, which imaging beam path is separated by a color-selective layer and is designed as a first or second image processing sensor with a second working distance and a second camera or is designed as a laser distance sensor or is designed as an illumination beam path of a second wavelength.

32. The arrangement according to claim 30, characterized in that the touching form element, or the associated mark, has a shape that is partially flattened on a side facing the sensory mechanism.

33. The arrangement according to claim 13, characterized in that the touching form element, or the associated mark, has a shape selected from the group consisting of needle-shaped, nearly spherical, tear-shaped, and partially flattened.

* * * * *